June 2, 1953 C. W. CHILLSON 2,640,552

PROPELLER PITCH CHANGE MECHANISM

Filed June 8, 1946 17 Sheets-Sheet 1

INVENTOR
CHARLES W. CHILLSON
Godfrey B. Speir
ATTORNEY

PROPELLER PITCH CHANGE MECHANISM

Filed June 8, 1946 17 Sheets-Sheet 2

INVENTOR
Charles W. Chillson
BY F. P. Keiper
ATTORNEY

INVENTOR
Charles W. Chillson
T. P. Keiper
ATTORNEY

June 2, 1953 C. W. CHILLSON 2,640,552

PROPELLER PITCH CHANGE MECHANISM

Filed June 8, 1946 17 Sheets-Sheet 4

INVENTOR
Charles W. Chillson
BY F. P. Keiper
ATTORNEY

June 2, 1953 C. W. CHILLSON 2,640,552

PROPELLER PITCH CHANGE MECHANISM

Filed June 8, 1946 17 Sheets-Sheet 5

INVENTOR
Charles W. Chillson
BY [signature]
ATTORNEY

June 2, 1953 C. W. CHILLSON 2,640,552

PROPELLER PITCH CHANGE MECHANISM

Filed June 8, 1946 17 Sheets-Sheet 6

INVENTOR
Charles W. Chillson
BY F. P. Keiper
ATTORNEY

June 2, 1953 C. W. CHILLSON 2,640,552

PROPELLER PITCH CHANGE MECHANISM

Filed June 8, 1946 17 Sheets-Sheet 7

INVENTOR
Charles W. Chillson
O. P. Kerper
ATTORNEY

June 2, 1953 C. W. CHILLSON 2,640,552

PROPELLER PITCH CHANGE MECHANISM

Filed June 8, 1946 17 Sheets-Sheet 8

INVENTOR
Charles W. Chillson
BY F. P. Keiper
ATTORNEY

PROPELLER PITCH CHANGE MECHANISM

Filed June 8, 1946 17 Sheets-Sheet 9

INVENTOR
Charles W. Chillson
BY [signature]
ATTORNEY

June 2, 1953 C. W. CHILLSON 2,640,552

PROPELLER PITCH CHANGE MECHANISM

Filed June 8, 1946 17 Sheets-Sheet 10

INVENTOR
Charles W. Chillson
BY [signature]
ATTORNEY

June 2, 1953 C. W. CHILLSON 2,640,552

PROPELLER PITCH CHANGE MECHANISM

Filed June 8, 1946 17 Sheets-Sheet 11

INVENTOR.
Charles W. Chillson
BY
ATTORNEY

INVENTOR.
Charles W. Chillson
BY F. P. Keiper
ATTORNEY

INVENTOR.
Charles W. Chillson
BY F. P. Keiper
ATTORNEY

PROPELLER PITCH CHANGE MECHANISM

Filed June 8, 1946 17 Sheets-Sheet 14

INVENTOR.
Charles W. Chillson
BY B. P. Keiper
ATTORNEY

INVENTOR.
Charles W. Chillson
BY F. P. Keiper
ATTORNEY

INVENTOR.
Charles W. Chillson
BY F. P. Keiper
ATTORNEY

June 2, 1953 C. W. CHILLSON 2,640,552

PROPELLER PITCH CHANGE MECHANISM

Filed June 8, 1946 17 Sheets-Sheet 17

INVENTOR
Charles W. Chillson
BY Godfrey B. Speir
ATTORNEY

Patented June 2, 1953 2,640,552

UNITED STATES PATENT OFFICE 2,640,552

PROPELLER PITCH CHANGE MECHANISM

Charles W. Chillson, Caldwell, N. J., assignor to Curtiss-Wright Corporation, a corporation of Delaware Application June 8, 1946, Serial No. 675,383

31 Claims. (Cl. 170—160.18)

This invention relates to variable pitch propellers, and more particularly to such propellers wherein power for effecting changes of blade pitch is primarily derived from the propeller drive shaft.

In variable pitch propellers, it has become desirable to increase the speed with which changes in pitch may be effected. This is particularly true where reverse pitch is to be employed for reducing the speed of an aircraft as when landing or during maneuvers requiring such rapid changes. Also it is desirable to feather a propeller rapidly. The speed with which such pitch changes can be made depends on the forces to be overcome, such as the centrifugal blade twisting moment, the inertia of the parts, friction and the power available to effect the change. Where power is limited to an independent pitch changing motor, the motor is necessarily limited in power capacity, and its effect for pitch changing is obtained only after overcoming starting inertia.

It is accordingly an object of the present invention to provide a pitch changing mechanism drivable from the propeller shaft, whereby high torque is instantly available and wherein advantage may be taken of relatively low rotational speed of the several parts by arranging the pitch changing structure so that it is subject to low stresses and low inertia loads. This enables construction of the mechanism with parts of light weight.

Another object of the invention relates to providing a pitch changing mechanism of the foregoing high torque type wherein pitch changing may be effected at a fast rate for maneuvering, or a slow rate for regulating the speed of rotation of the prime mover, the regulation being improved by the substantially instantaneous initiation and termination of changes in pitch.

Still another object of the invention is to provide a rugged light compact mechanism capable of effecting pitch changes at a high rate of speed, and adapted for mounting on the propeller shaft or hub without substantially increasing the overhang or loading thereof.

Another object of the invention is to provide a pitch changing mechanism of a unitary independent construction, and in which the various load carrying components are unitary and readily accessible for inspection.

Further objects of the invention are to provide in a pitch changing system a rugged mechanism for transmitting the power instantly from the propeller shaft to the blades, and for automatically controlling and limiting the operation of the system in a highly desirable manner.

Additional objects are concerned with hydraulic and electrical control mechanism and means for feathering or unfeathering the propeller when the propeller shaft ceases rotation or drops below a minimum prescribed speed, and other desirable or safety features enhancing the reliability and simplicity of operation under widely varying conditions.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had to the appended claims.

In the drawings, wherein like reference characters indicate like parts:

Figure 2:
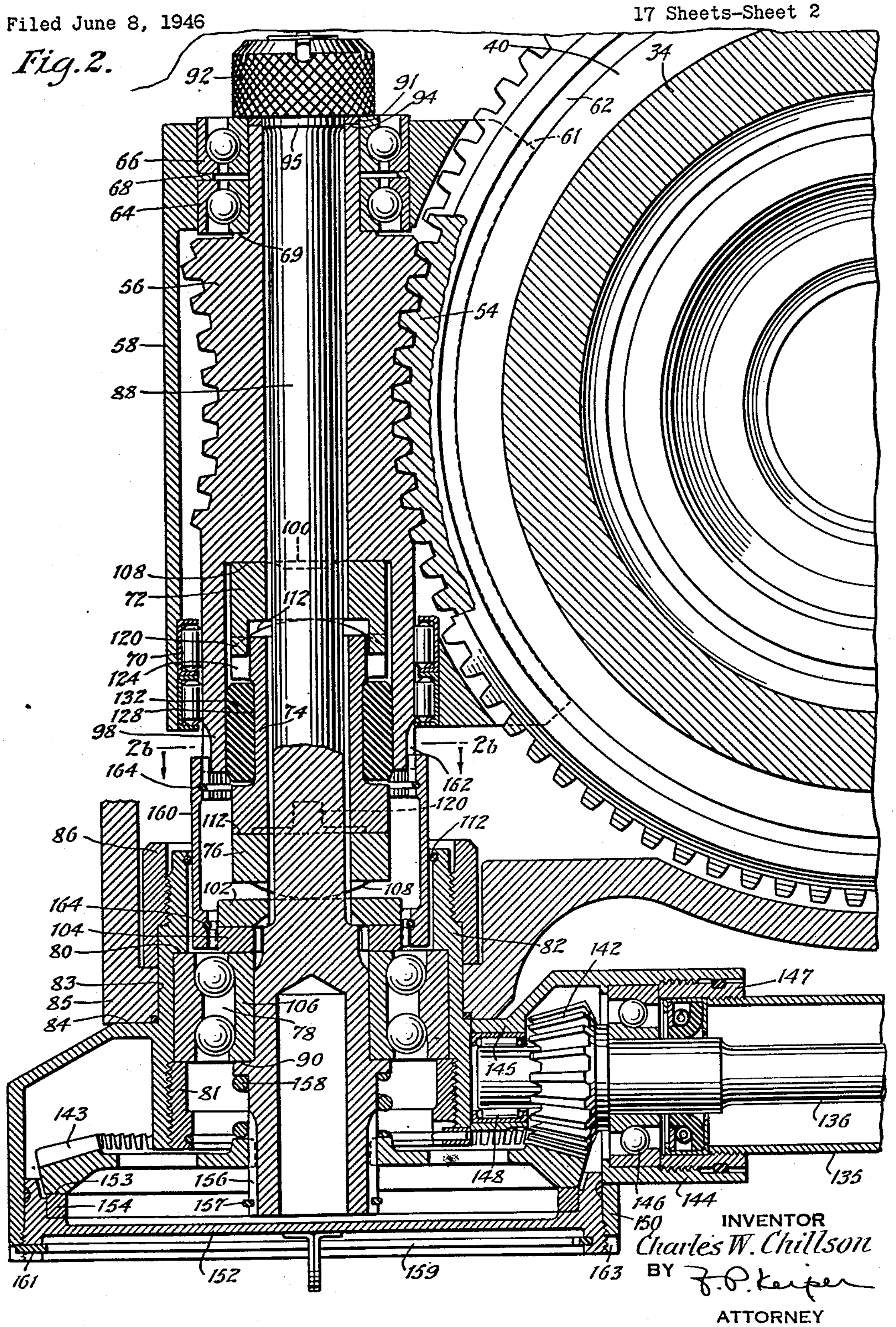
Fig. 2 is a section taken substantially on the line 2—2 of Fig. 1.
Figure 2A:
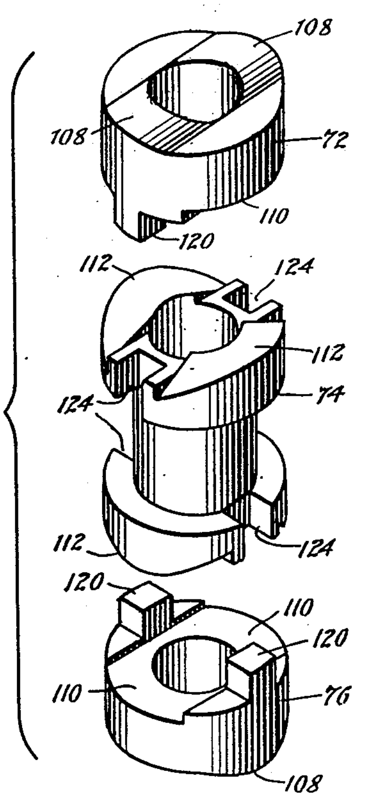
Figure 2B:
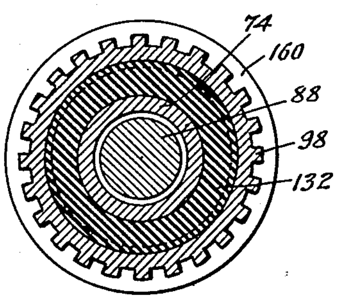
Figure 3:
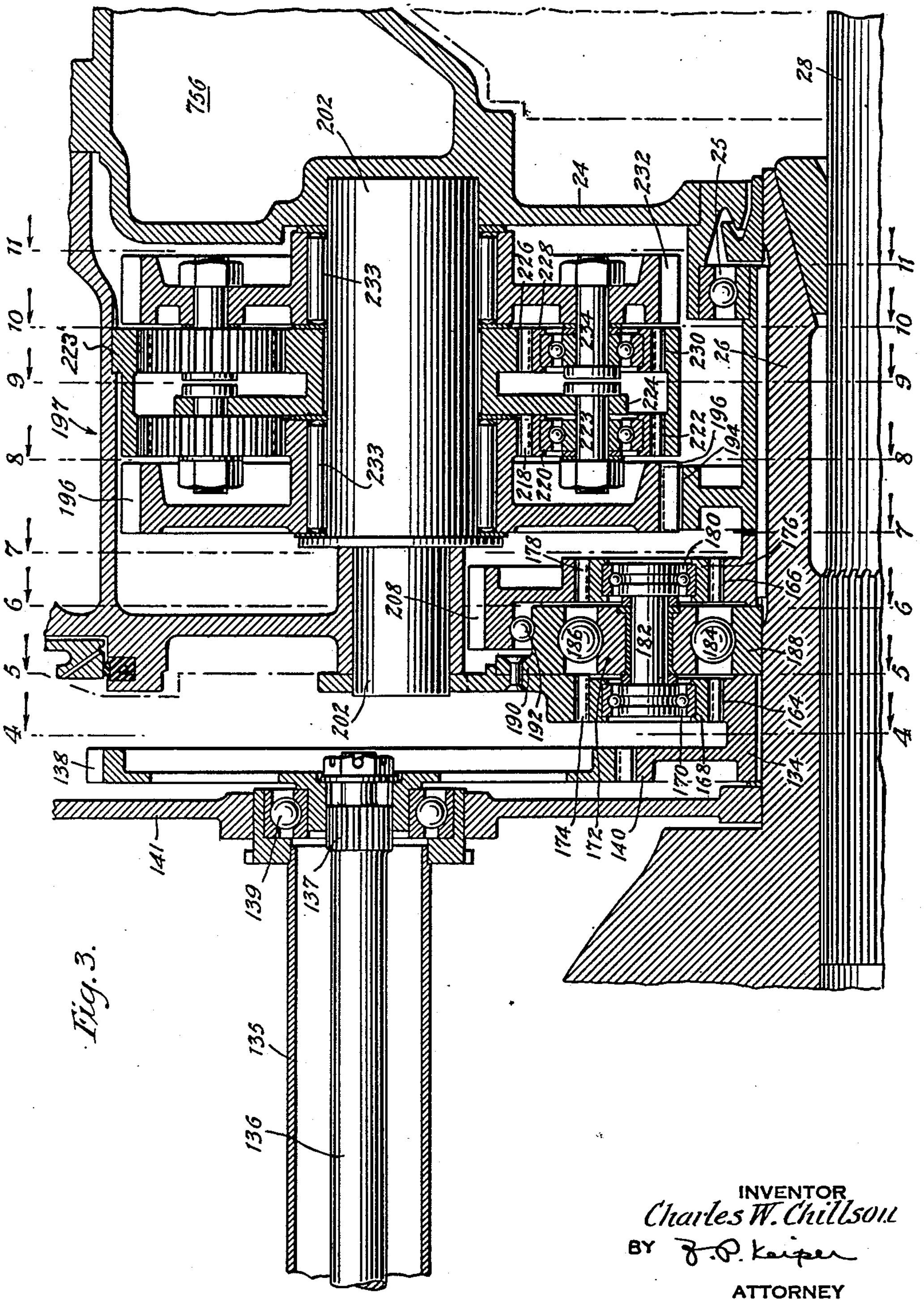
Figure 4:
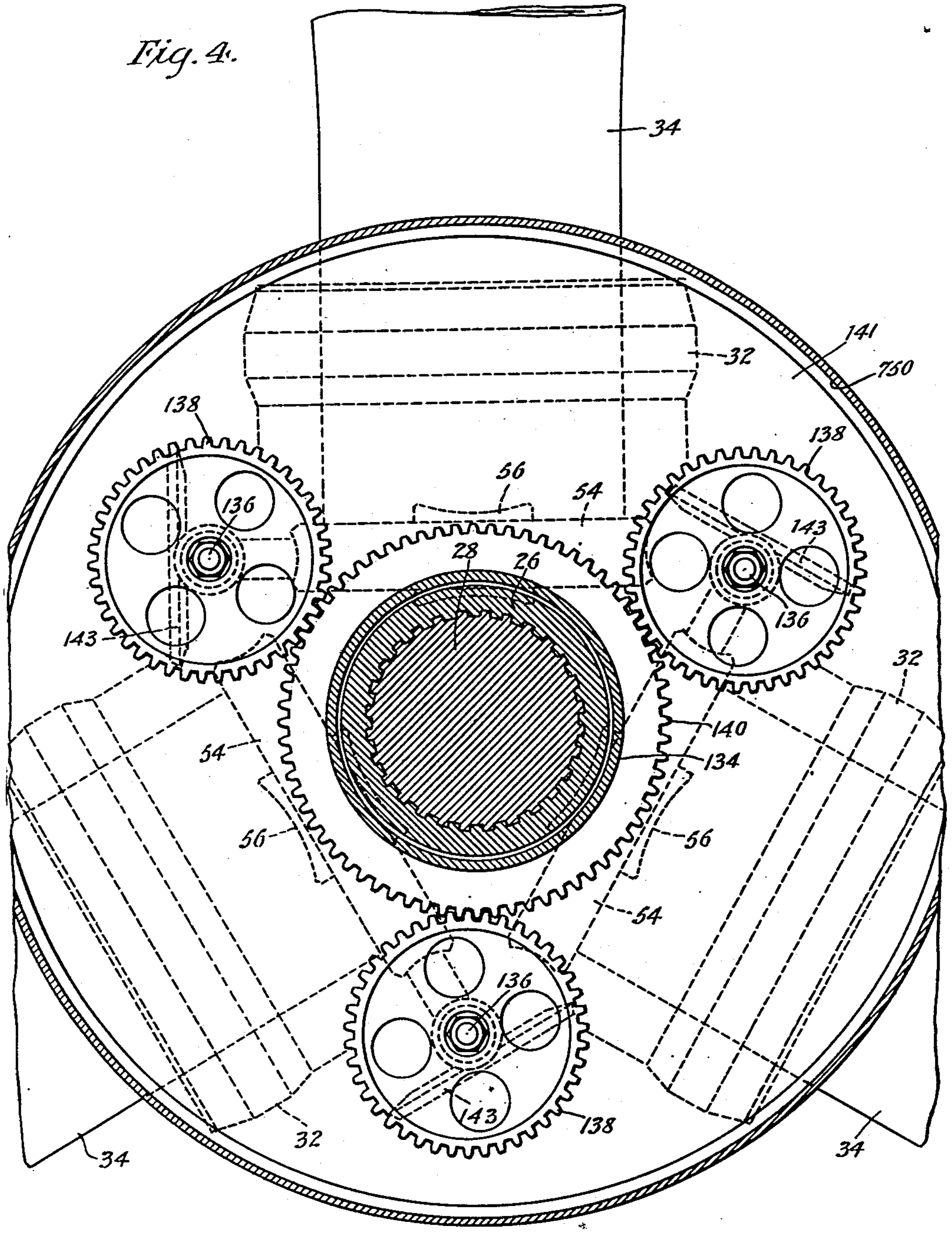
Figure 5:
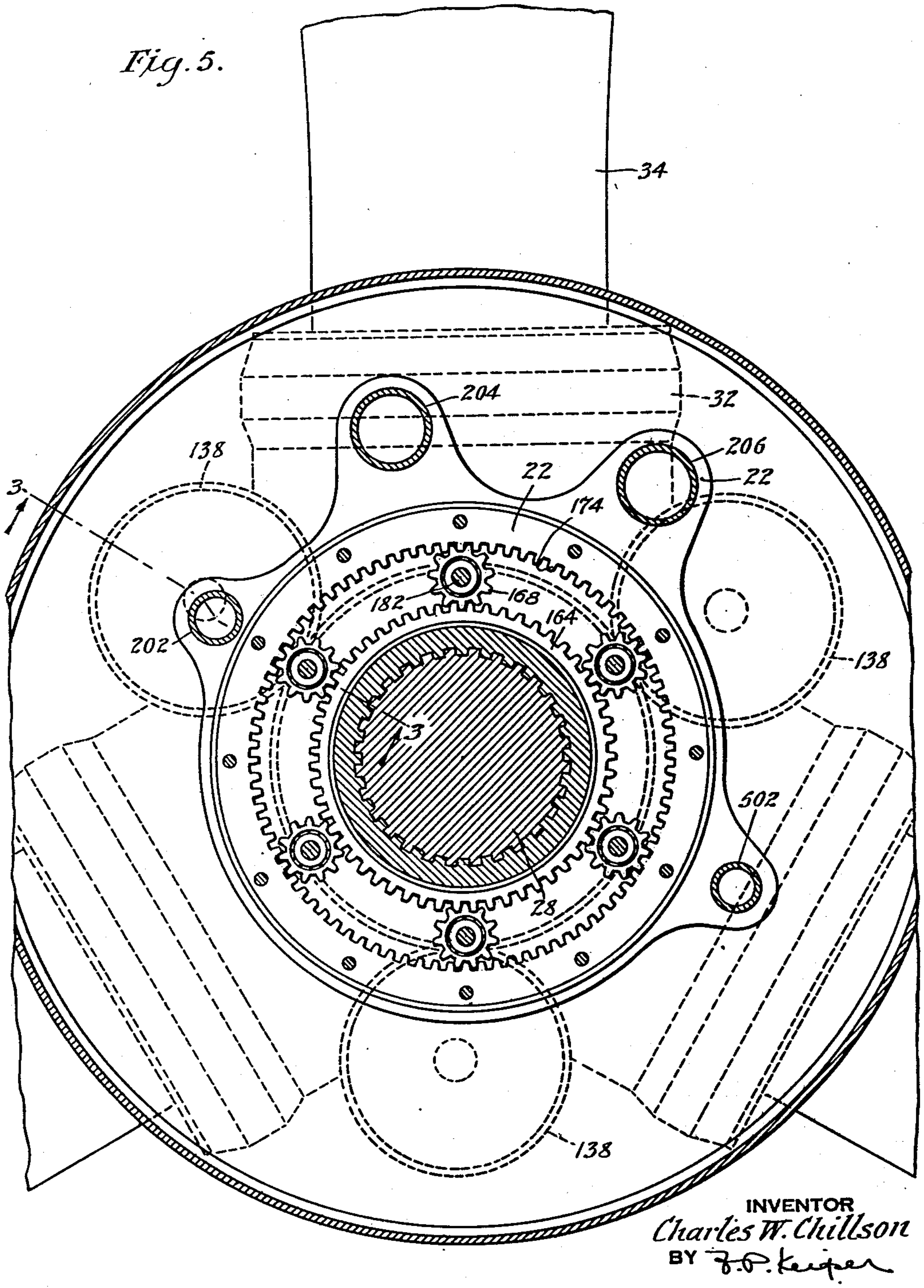
Figure 6:
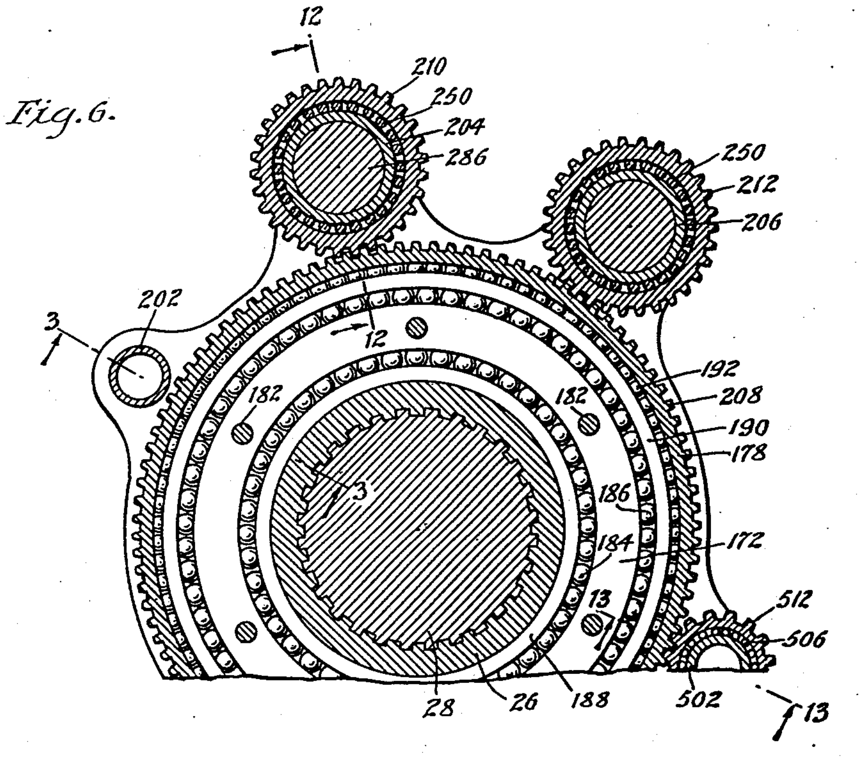
Figure 7:
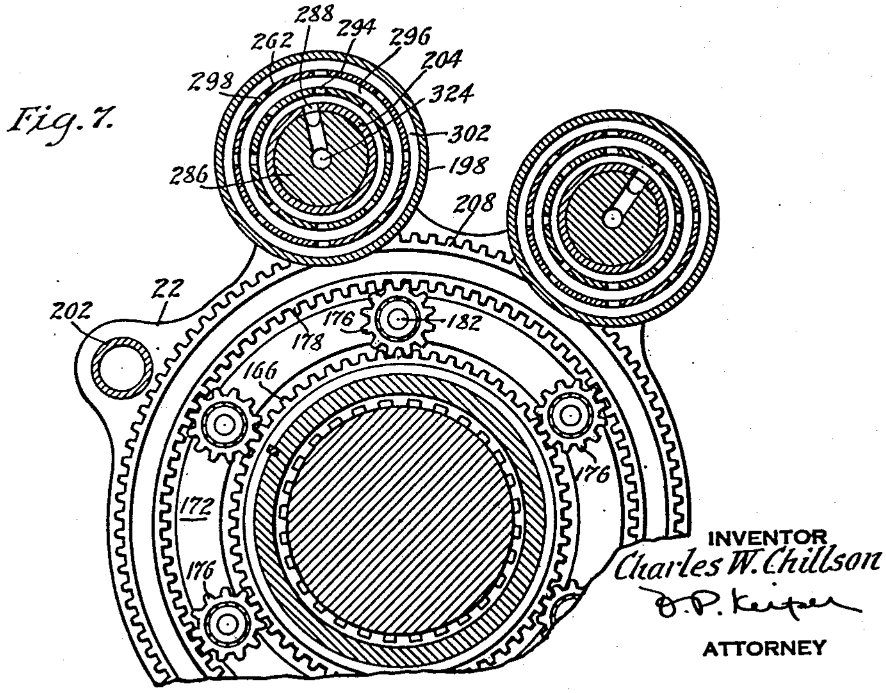
Figure 8:
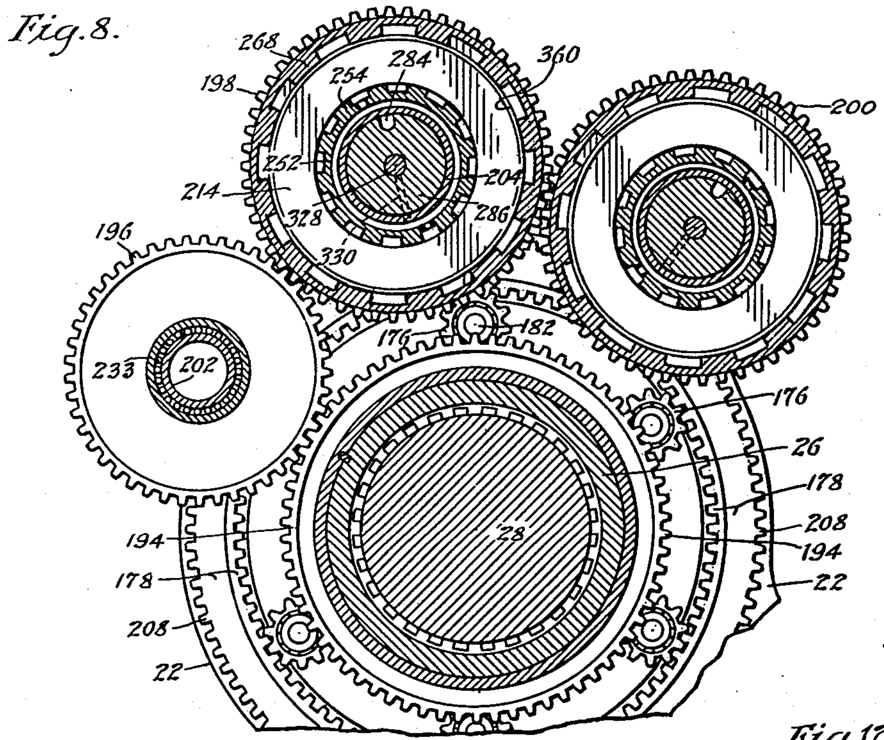
Figure 12A:
Figure 9:
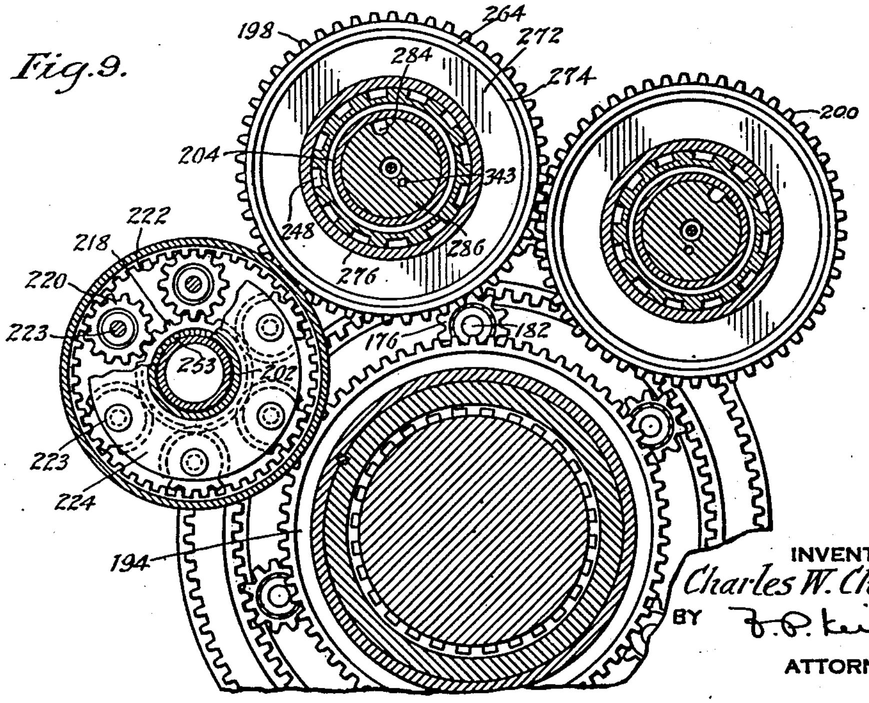
Figures 10, 11:
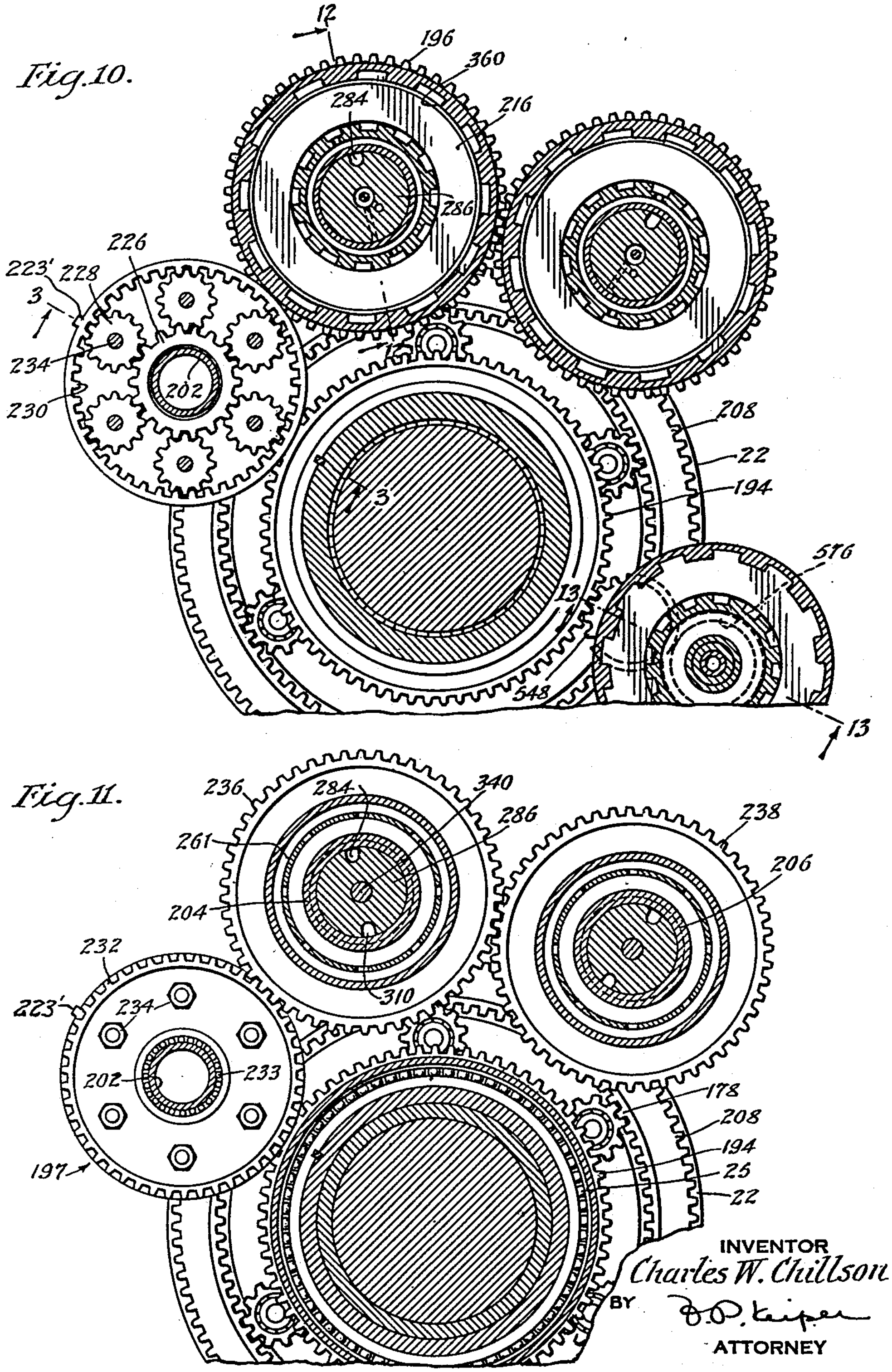
Figure 12:
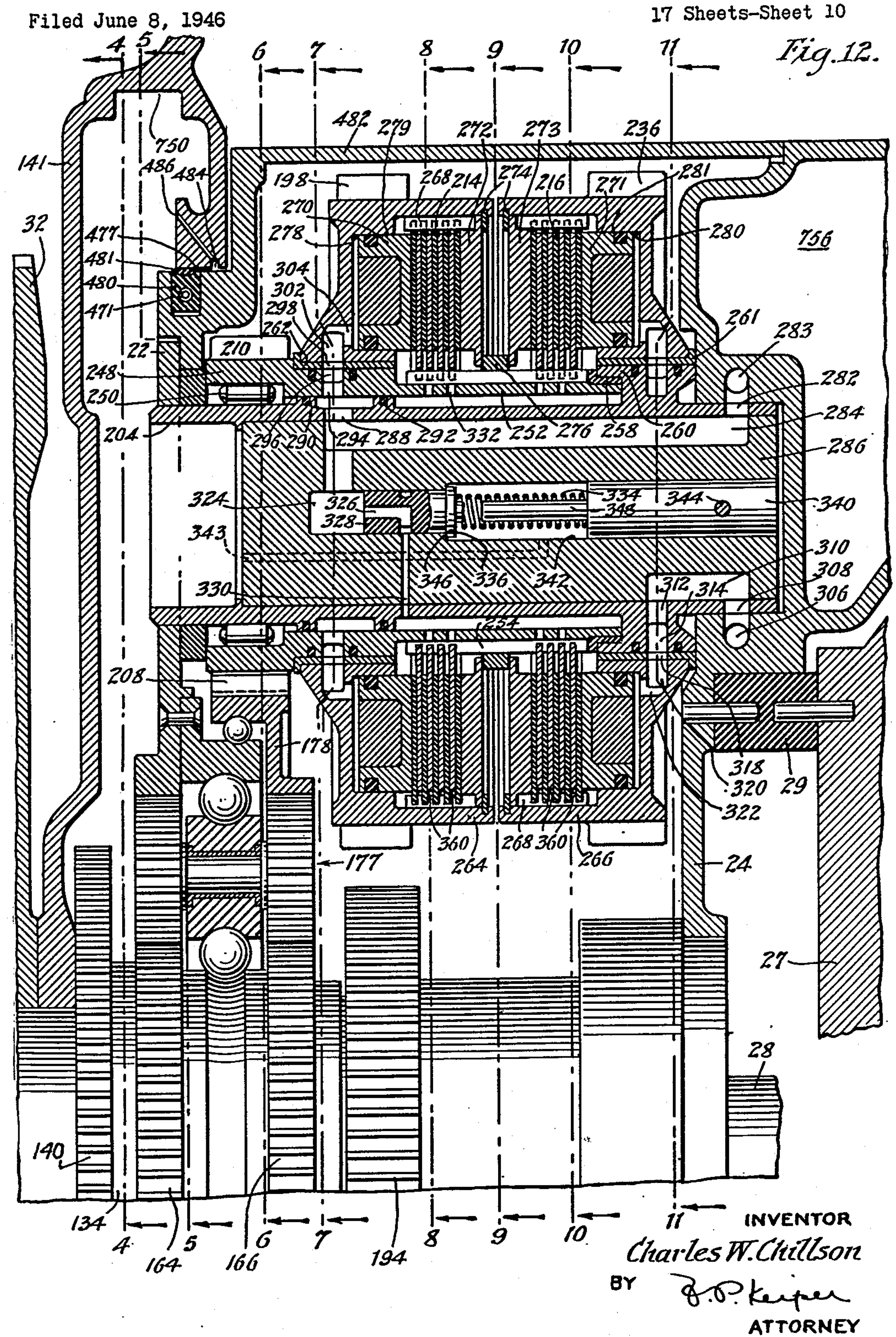
Figure 13:
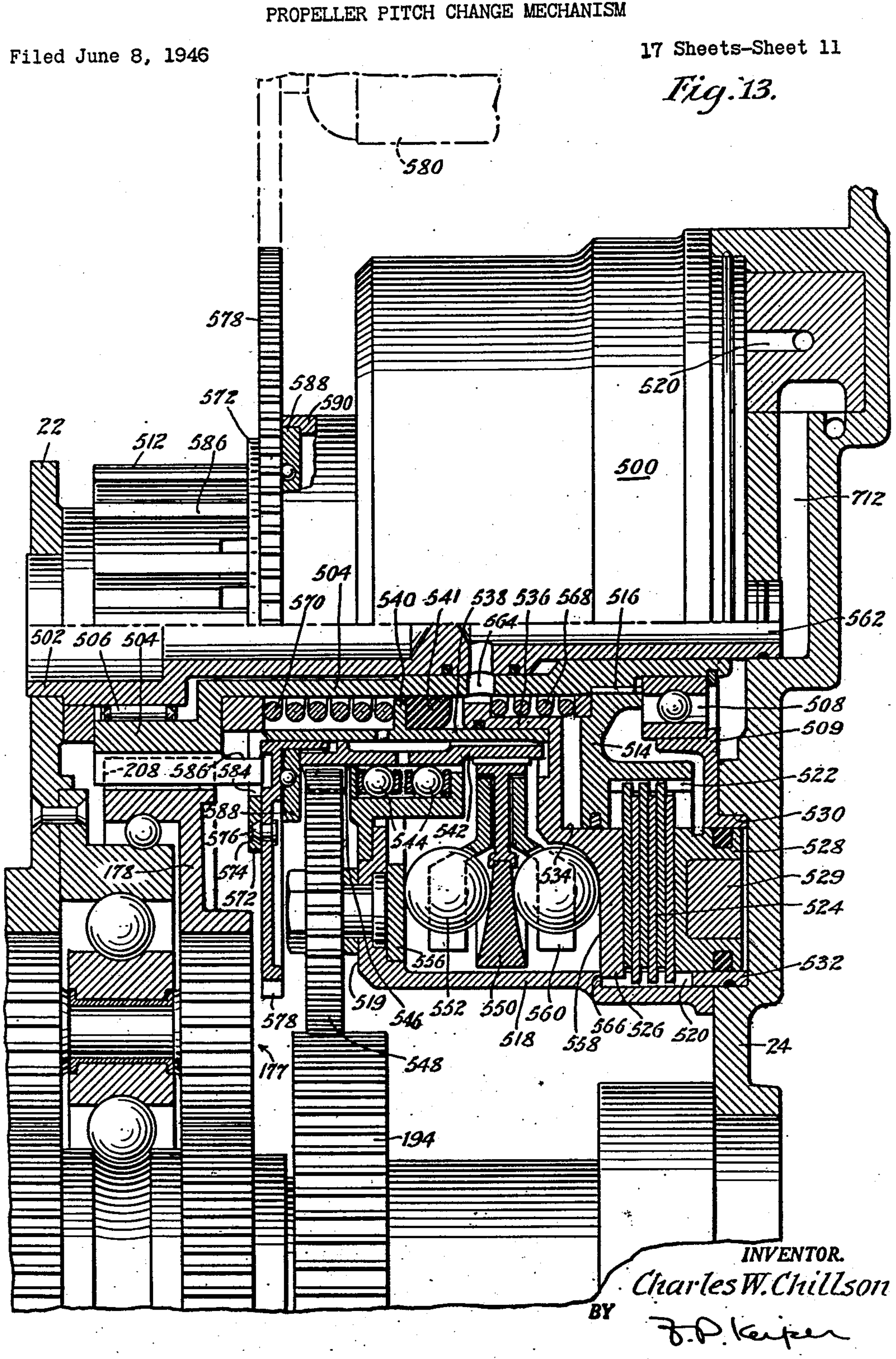
Figure 14:
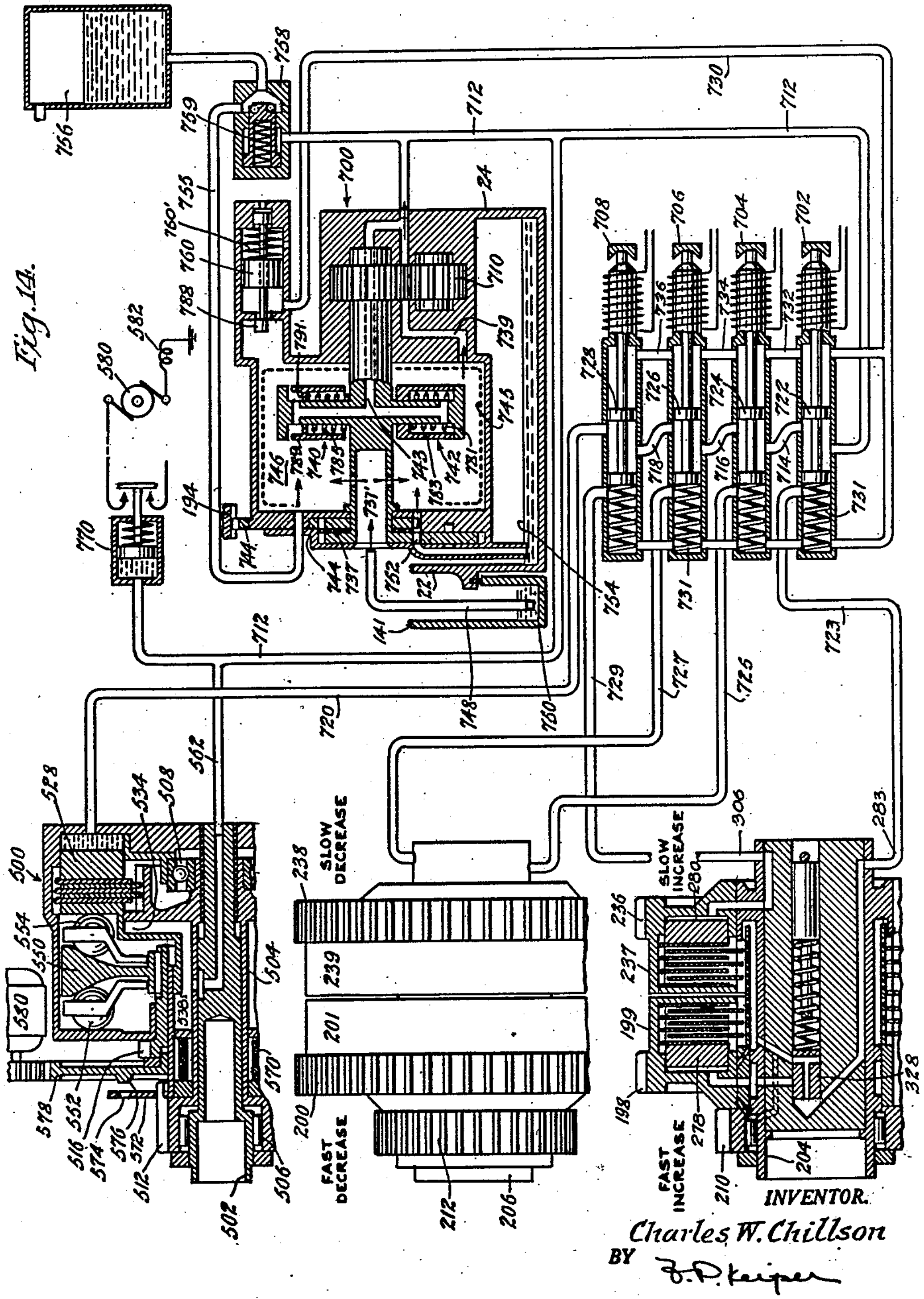
Figure 15:
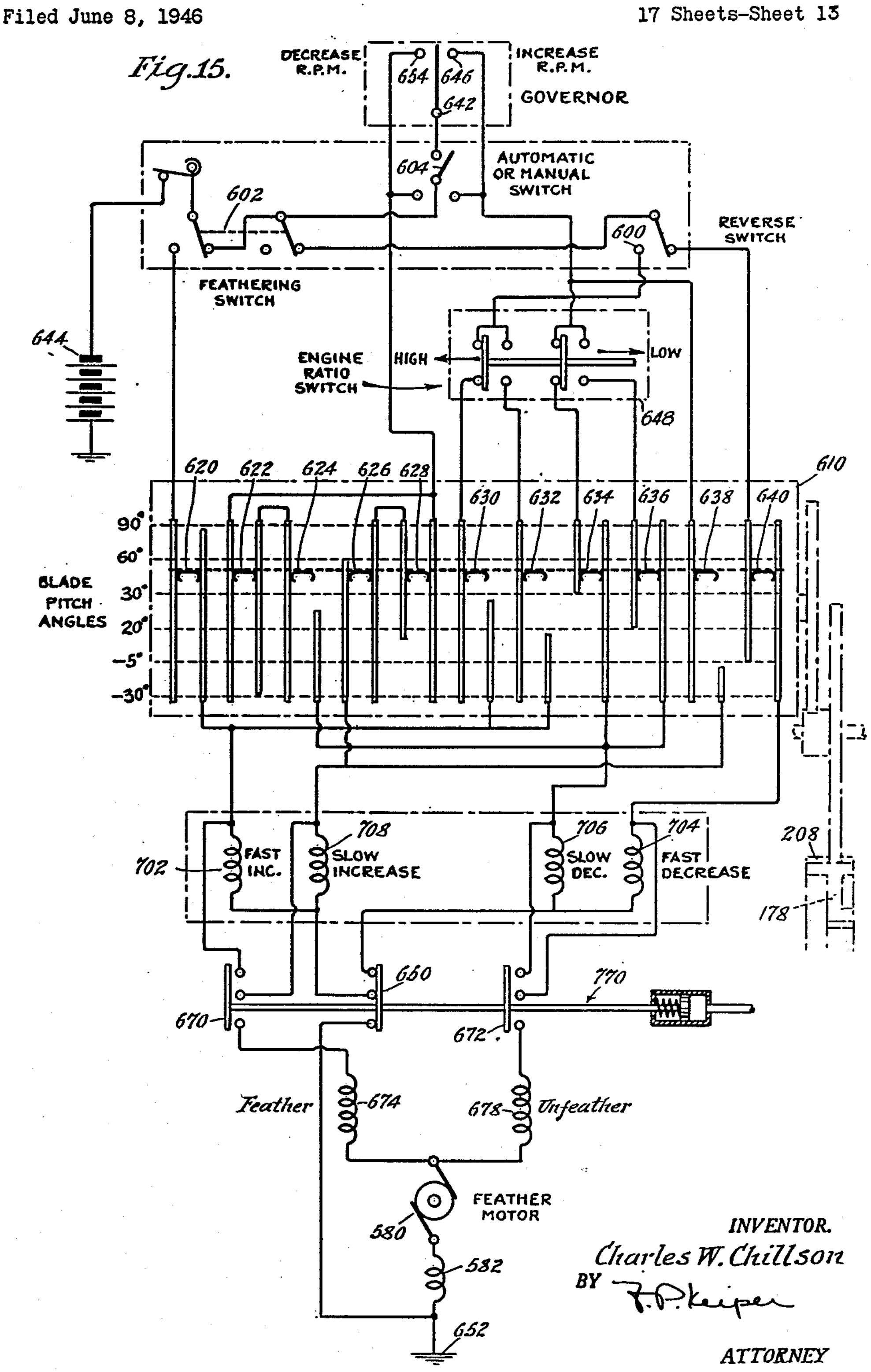
Figure 16:
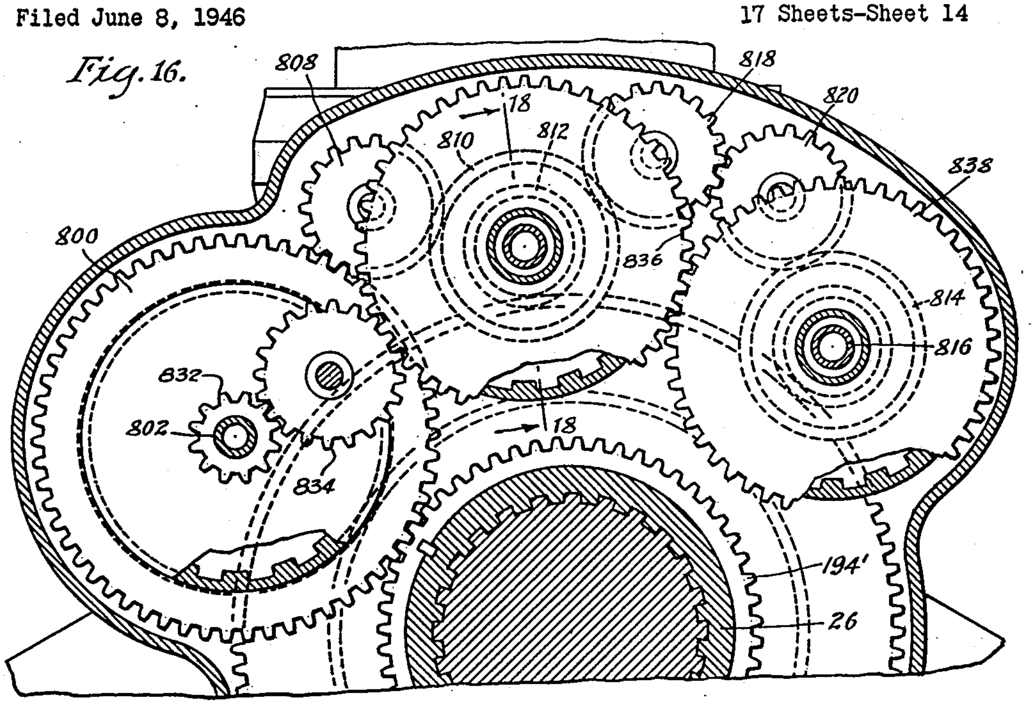
Figure 17:
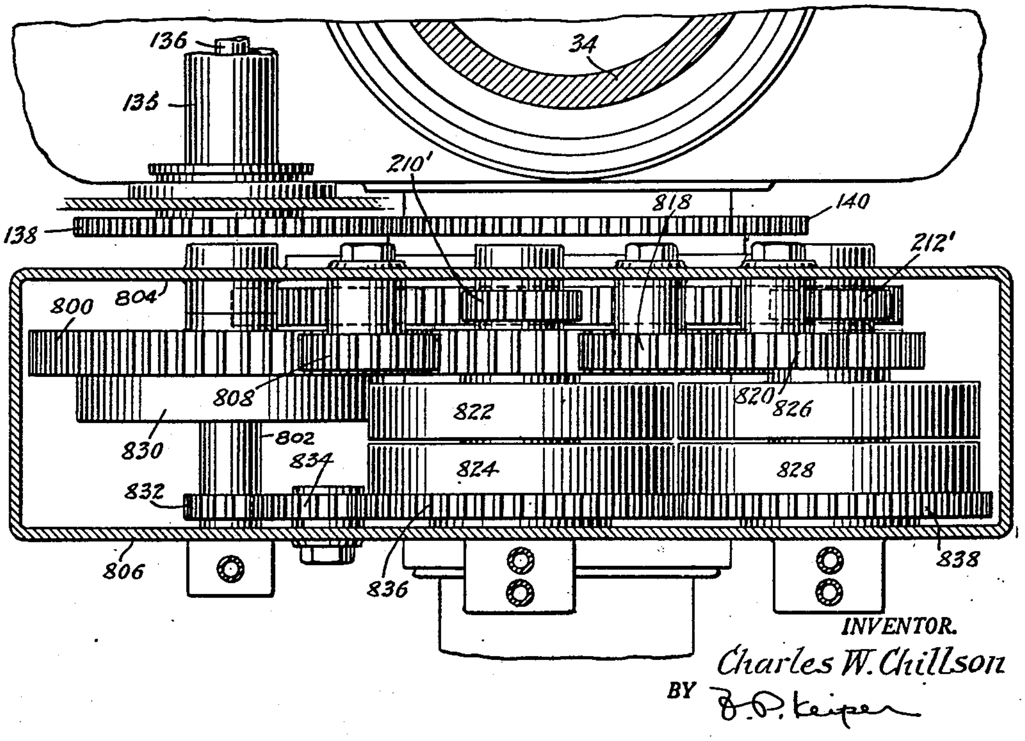
Figure 18:
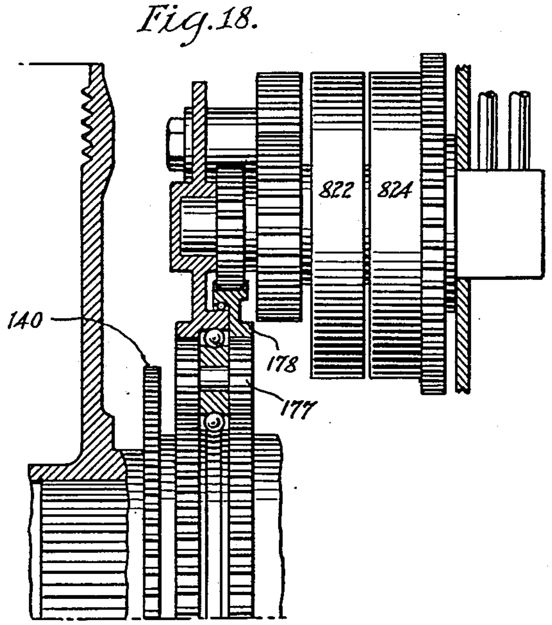
Figure 21:
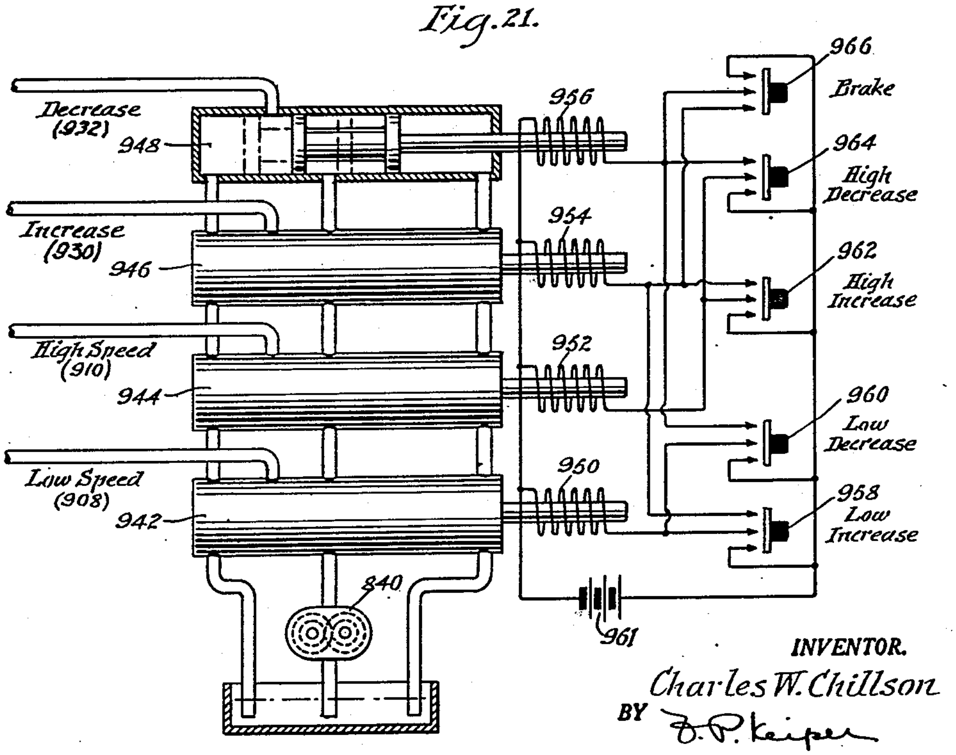
Figure 19:
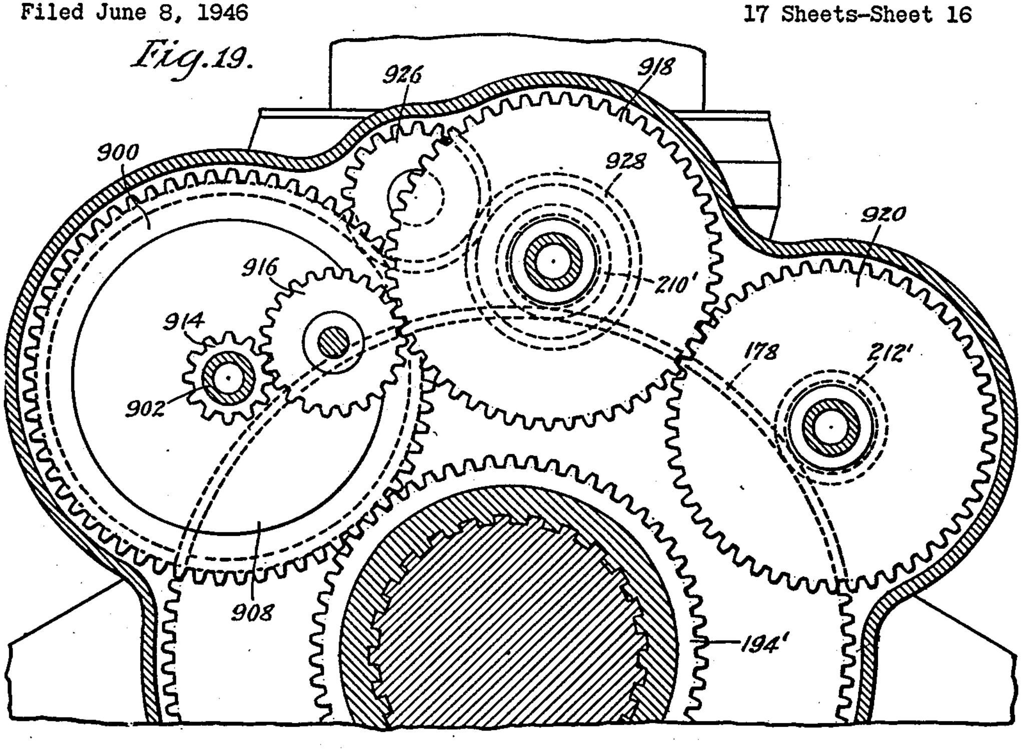
Figure 20:
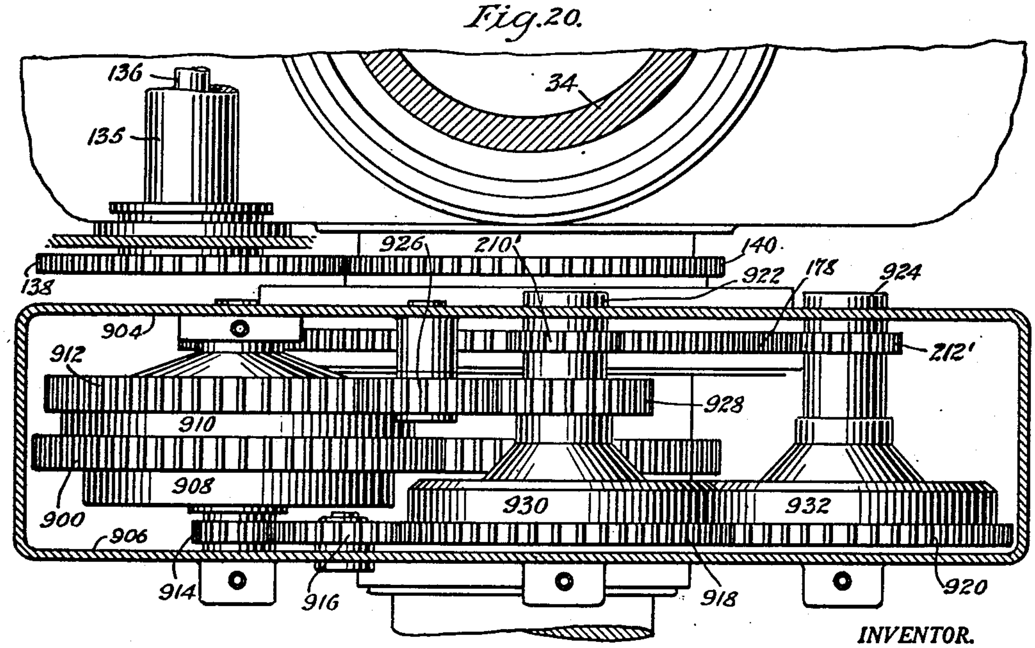
Figure 22:
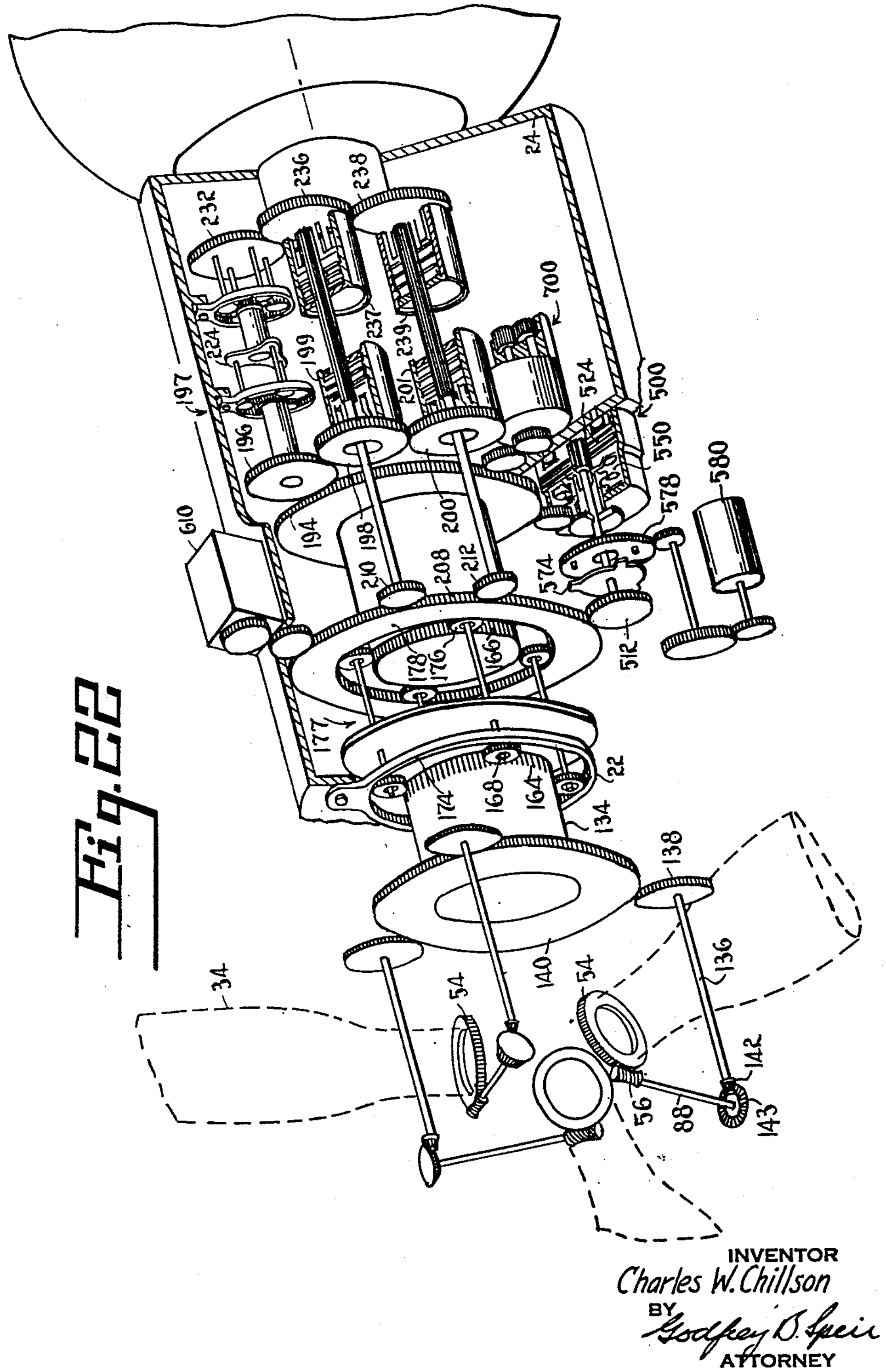

Fig. 2*a* is a detailed perspective view of thrust elements illustrated in Fig. 2;

Fig. 2*b* is a transverse section taken on the line 2*b*—2*b* of Fig. 2 showing a splined flexible connection;

Fig. 3 is a longitudinal axial section through the hub intergearing and speed reducer, the section being taken substantially on the lines 3—3 of Figs. 5, 6 and 10;

Fig. 4 is a transverse section taken substantially on lines 4—4 of Figs. 3 and 12;

Fig. 5 is a transverse section taken substantially on the lines 5—5 of Figs. 3 and 12;

Fig. 6 is a transverse section taken substantially on the lines 6—6 of Figs. 3 and 12;

Fig. 7 is a transverse section taken substantially on the lines 7—7 of Figs. 3 and 12;

Fig. 8 is a transverse section taken substantially on the lines 8—8 of Figs. 3 and 12;

Fig. 9 is a transverse section taken substantially on the lines 9—9 of Figs. 3 and 12;

Fig. 10 is a transverse section taken substantially on the lines 10—10 of Figs. 3 and 12;

Fig. 11 is a transverse section taken substantially on the lines 11—11 of Figs. 3 and 12;

Fig. 12 is a longitudinal section taken on the lines 12—12 of Figs. 6 and 10;

Fig. 12*a* is a side elevation of the resilient spacer ring enlarged employed in the clutch and brake of Figs. 8–13;

Fig. 13 is a side elevation of the brake, parts of which are shown in section taken substantially on the lines 13—13 of Figs. 6 and 10;

Fig. 14 is a control diagram showing the fluid pressure system employed;

Fig. 15 is a control diagram showing the electrical control circuits employed;

Fig. 16 is a view partly in section and partly in elevation of a modified form of the gearing;

Fig. 17 is a top plan view of the modified form of Fig. 16;

Fig. 18 is a fragmentary view partly in section looking generally toward the line 18—18 of Fig. 16, showing the clutch and associated gears;

Fig. 19 is a further modified form of gearing illustrated partly in section;

Fig. 20 is a plan view, partly in section, of the form of gearing shown in Fig. 19;

Fig. 21 is a modified control system applicable to the system of Figs. 19 and 20; and Fig. 22 is a perspective, schematic view, partly broken away, showing principal components of the propeller and pitch changing assembly.

A reference to Figs. 1 and 22 will disclose the general arrangement of a preferred form of the invention and serve to correlate the various parts hereinafter described in more detail. Therein appears a propeller hub 20, having a plurality of blade sockets 32 for swivelly receiving the shanks 34 of the propeller blades. The hub is provided with an integral sleeve 26 extending to the rear, within which is splined a drive shaft 28. Disposed around the sleeve are high and low speed gear trains composed of gears 196, 198 and 200, and gears 232, 236 and 238, respectively, arranged on spindles 202, 204 and 206, supported between stationary plate 22 and a rear housing wall 24. The gear 196 of the high speed gear train 196, 198 and 200 is geared directly to a power driven gear 194 keyed to the hub, and gears 198 and 200 are thus power driven in reverse directions. The gear 232 of the low speed gear train is driven from the gear 196 through a planetary speed reducer 197, and drives gears 236 and 238 reversely with respect to each other at a relatively slow speed. Through selective operation of any one of four hydraulic clutches 199, 201, 237 and 239 associated with each of the gears 198, 200, 236 and 238, one or the other of gears 210 or 212 is caused to drive in either direction the externally and internally toothed control ring gear 178 of an intergearing 177 at a high or low rate of speed. Movement of the control gear is transmitted through the planetary intergearing to a hub carried gear 140, which may be advanced or retarded at high or low speed relative to the hub to vary the blade pitch, transmission to each blade being individually effected through means including gears 138 driving, through shafts 136 and 88, a worm 56 and a worm wheel sector 54 carried by each blade shank. The pitch may be fixed, by holding ring gear 178 by means of a combination hydraulic and centrifugal brake 500 connected to gear 512. Feathering or unfeathering, when propeller rotation is at low speed or stopped, is accomplished through an auxiliary motor 580 acting through a gear 578.

Referring more particularly to the hub, each of the blade sockets 32 is provided with a threaded blade retention nut 36 against which the outer race members 37 of the thrust bearing 38 bear. The inner race member 39 of the thrust bearing engages a shoulder or flange 40 upon the shank 34. Within the base of each socket is arranged, upon a hub sleeve extension 41, a thrust bearing support 42 having slidingly mounted thereon upon a pad 43, a thrust bearing 44 carrying a preloading annular spring disc 46 adapted to resiliently urge the end of each of the blade shanks 34 outwardly during non-rotation of the hub. Any suitable packing such as 48 may be provided in conjunction with each of the retaining rings 36 to confine the lubricant in the thrust bearings 38. The inner race member 39 of the thrust bearing and retaining ring 52 may be split to facilitate mounting on the shank.

Figure 1:
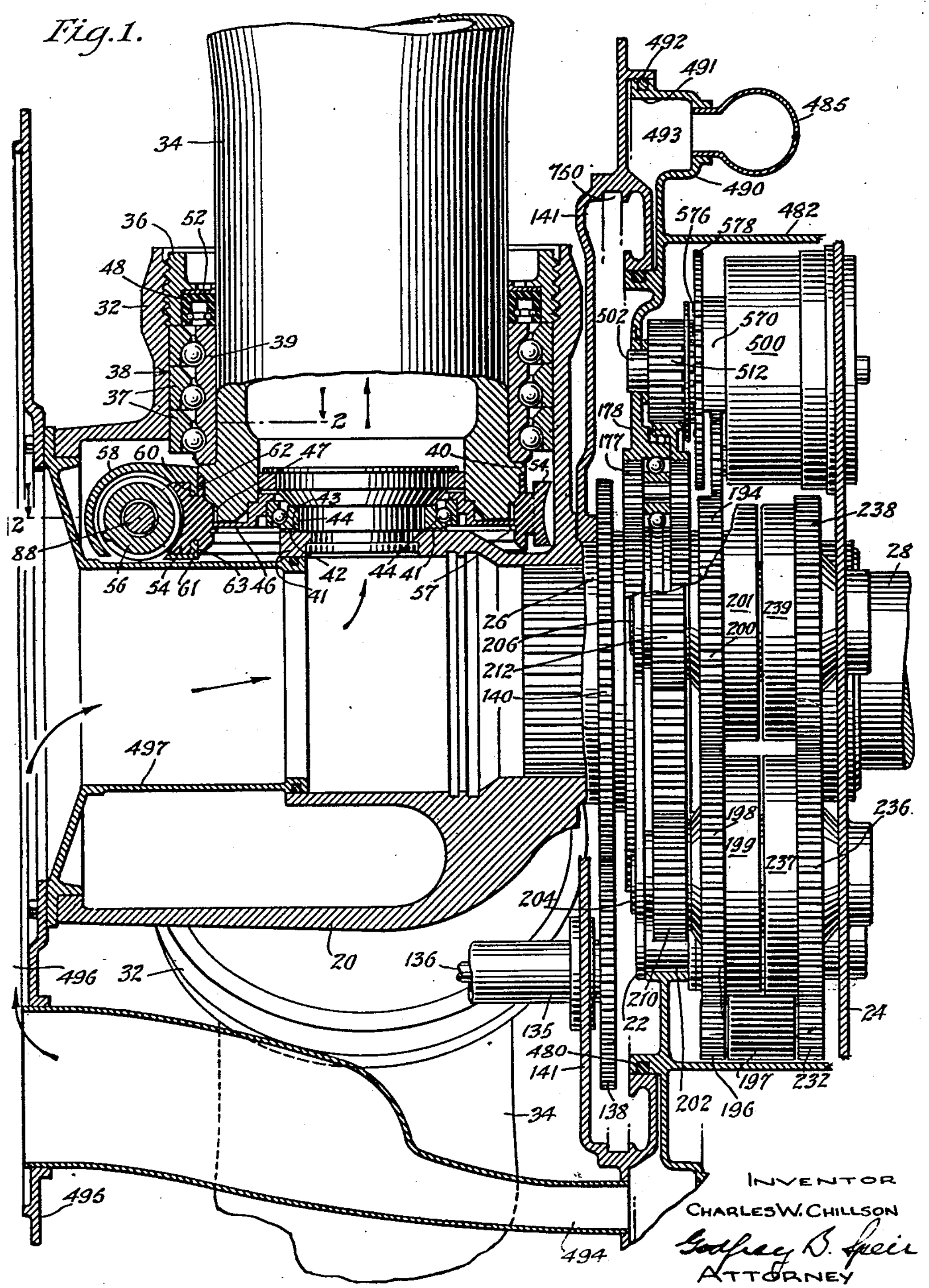
Fig. 1 is a plan view of the propeller and pitch changing assembly looking downwardly at an inclined angle, certain of the parts being cut away and shown in section.

Each of the propeller blade sockets has associated therewith a pitch changing transmission employing bevel gears and a worm and worm wheel drive as shown in Figs. 1, 2 and 3, driven from the individual gears 138 enmeshed with the relatively rotatable hub carried gear 140. Each blade shank 34 has splined thereon adjacent the end flange 40, a ring carrying a sector worm wheel 54 meshing with an hourglass worm 56. The worm wheel is held in position on the blade, at the splines 47 by the edge of the spring ring 46 which bears on the ends of the splines 47 on the worm wheel ring interior. The worm ring is secured on the spring ring 46 by a lock ring 57. To maintain proper tangential alignment of the worm with respect to the worm wheel, regardless of blade alignment due to blade stresses, the worm is journaled on bearings 64, 66 and 70 within a shoe 58, having arcuate flanges 60 and 61 adapted to ride within annular grooves 62 and 63 on opposite faces of the worm wheel.

The bearings 64 and 66 (see Fig. 2) bear oppositely upon an intervening shoulder 68 located internally within one end of the shoe 58, and positively locate the worm axially with respect to the shoe in one direction through the bearing 64 and shoulder 68, and in the other direction through bearing 66, tension in the spindle 88, and a series of thrust blocks 72, 74 and 76 threaded therearound and reacting upon the opposite thrust face 100 of the worm. A ductile washer of copper 91 confined between an enlarged head 95 on the spindle 88, the end 94 of the worm, the inner race of bearing 66 and an adjustable knurled spindle nut 92 transmits thrust to the worm, while the nut bears directly upon the bearing 66.

The thrust block 76 of the blocks 72, 74 and 76 engages through an annular plate 102, an annular internally and externally splined ring 104, and thence upon the internal dual race 106 of a thrust bearing 78, which is seated against a shoulder 90 on the spindle 88. The thrust bearing 78, being confined with respect to the worm through the tension of spindle 88 and the compression blocks, plate 102 and ring 104, is adapted to transmit the blade turning moment to the hub through a bearing and bevel gear housing sleeve 82 positioned in an aperture 83 in an integral extension 85 of the hub socket, the sleeve being secured between a shoulder 84 and the sleeve nut 86, and the bearing 78 being secured within the sleeve between a shoulder 80 and internal sleeve nut 81.

The thrust blocks loosely surround the spindle 88, and provide universal movement between the worm thrust face 100 and the annular thrust plate 102. As shown in Fig. 2*a*, block 72 is provided on one end with arcuate cylindrical faces 108 adapted to rock upon the end face 100. The opposite end is provided with plane faces 110 adapted to engage arcuate faces 112 on one end of the block 74, as well as lugs 120 adapted to cooperate with lug recesses 124 on block 74. The opposite ends of block 74 are similar but rotated 90° to provide rocking motion in perpendicular planes, and the blocks 76 and 72 are identical, but maintained angularly displaced by 90° by the lugs 120 and recesses 124, the block 76 rocking upon the plate 102. The reduced central portion 128 of block 74 is provided with an annular resilient rubber-like member 132 compressed around the block and within the sleeve extension 98 of the worm to afford resilient centralization of the blocks.

In order to drive each of the worms from the relatively rotatable hub carried gear 140, and each of the gears 138, a bevel gear 143 and pinion 142, the latter driven by the gear 138 and the former splined on the spindle 88, are provided. The pinion and its shaft 136 are journaled on either side of the pinion within a tubular housing member 144 having a reduced end portion 145 integrally secured to the bearing and gear housing 82, the parts being secured by copper brazing or other suitable means. The reduced portion 145 encloses a roller bearing 148 in advance of the pinion 142, and an anti-friction bearing 146 is positioned behind the pinion and held in place within the housing by an internal sleeve nut 147. The shaft 136 extends to a splined connection 137 with the gear 138, within a tubular housing 135 extending from the sleeve nut 147 to a hub mounted gear housing bulkhead 141 in which the gear 138 is journaled as at 139 (see Fig. 3).

The bevel gear 143 is loosely splined upon the splined end 156 of spindle 88 to afford limited universal movement with respect thereto, and a peripheral face 153 of the gear bears against a ring bearing face 154 carried by the cover plate 152 threaded within the end 150 of the gear housing sleeve 82. A coil spring 158 bearing against shoulder 90 and gear 143 maintains the bevel gear against the cover plate bearing face 154, and overcomes any separating couple produced between the gears 142 and 143. The cover plate 152 may be removed to permit indexing of the gear 143 with respect to gear 142, in which case the spring 158 unmeshes the gear, moving it outward into engagement with split ring 157. The cover may be locked in any adjusted position by a spring ring 159 having a lug 161 adapted to protrude into any one of a number of slots 163.

The gear 143 drives the worm 56 through the spindle 88, splined ring 104, and a universally movable internally splined sleeve 160 confined by split rings 164 between its splined engagement with the ring 104, and splines 162 on the exterior end portion of the worm end sleeve 98. Through the resiliency of the spindle 88, and the flexibility of the blocks, the worm is allowed to float with the blade in response to movements under stress of the blade.

The planetary intergearing system for transferring movements of the control gear 178 to the relatively rotatable hub carried sleeve 134 and gear 140 is best shown in Fig. 3. The planetary intergearing comprises sun gears 164 and 166 having like pitch circle diameters, the sun gear 164 being formed integral with the sleeve 134 and gear 140 and the sun gear 166 being keyed to the hub sleeve 26. A series of planet gears 168 arranged upon antifriction bearings 170 mounted on one end of stub shafts 182 secured in a ring 172 intermesh with the sun gear 164 and a fixed internal gear 174. A second set of similar planet gears 176 mounted on the opposite end of the stub shafts 182 on anti-friction bearings 180 are arranged around and in mesh with the sun gear 166 and the surrounding annular internal control gear 178. The ring 172 is confined by internal and external antifriction bearing balls 184 and 186 arranged around and within a hub sleeve supported bearing race 188 and an annular fixed bearing race 190. The sleeve 134 is floated by engagement of its gears 140 and 164 with the gears 138 and planet gears 168 respectively. The bearing bracket 190 carries antifriction balls 192 exteriorly thereof for rotatably supporting the internal gear ring 178.

Keyed also to the hub is a power gear 194 adapted to drive the gear train (see Figs. 1, 3 and 8), composed of the intermediate gear 196 and clutch containing gears 198 and 200. The intermediate gear 196 and clutch-containing gears 198 and 200 are rotatably supported upon hollow spindles 202, 204 and 206, respectively, extending between the plate 22, and housing wall 24. The housing is supported from the propeller shaft through bearing 25 and the intergearing bearing including ring 172 and balls 184 and 186, and is held against rotation by connections to the engine nose 27 through a plurality of angularly spaced resilient plastic blocks such as 29 (see Fig. 12). The ring internal gear 178 is provided on its outer periphery with gear teeth 208 in mesh with pinions 210 and 212 also journaled upon the spindles 204 and 206 (see Figs. 1 and 6). The pinion 210 or the pinion 212 may be drivably connected to the clutch-containing gears 198 or 200 through the respective clutches contained therein to effect rotation of the internal gear ring 178 in either direction as may be selected. It will be observed that any rotation of the internal gear ring 178 by pinions 210 or 212 through selective connection to gears 198 or 200 through the respective clutches 199 or 201, will bodily move the axes of the planet gears 176 around the hub, carrying the ring 172 and the planet gears 168 therewith. Since the planet gears 168 are in mesh with the stationary internal gear 174, the hub sleeve 134 with its sun gear 164 will be caused to rotate at a speed above or less than the speed of rotation of the hub, thereby driving the hub carried pitch-changing transmission gear train of each of the propeller blades heretofore described. With a hub rotation up to about 1200 revolutions per minute, it will be seen that by reason of the relative sizes of the gears shown that the angle of the blades may be changed at a rate as high as 45 degrees per second. Since such pitch change is effected through the use of power derived from the rotating hub and the prime mover connected thereto, ample power and high torque is available to overcome blade centrifugal twisting moments and effect changes of pitch through the entire range of 120 degrees from reverse pitch to full feather pitch in a matter of three seconds without diverting more than a few percent of the shaft power available.

In order to provide a means of more gradually effecting changes of pitch so that small increments of pitch change may be effected slowly to vary the load in a manner suitable to regulate the speed of the prime mover, a second train of gears 232, 236, 238 in combination with a planetary gear reduction 197 coaxial of the spindle 202 is provided as is shown in Figs. 1, 3, 11, and 22. As shown in Fig. 3, the intermediate gear 196 is provided with a sun gear 218 having arranged thereabout, planet gears 220 rotatable within a fixed internal ring gear 222 keyed as at 223'. The stub shafts 223 of the planet gears 220 are carried upon a spider or carrier 224 which in turn is provided with a sun gear 226, surrounded by a second series of planet gears 228 meshing within a second stationary internal ring gear 230. The planet gears 228 are pivoted on stub shafts 234 mounted on the web of gear 232 acting as a spider or carrier for the planets 228. The gears 196 and 232 are suitably journaled on antifriction bearings 233 on spindle 202, while the carrier 224 and integral sun gear 226 is freely supported solely by the planets 220 and 228, whereby to equally distribute the load among the interengaging gears. The relative diameter of gears 218, and 222, 226 and 230 determine the ratio of reduction between input gear 196 and output gear 232. In practice a reduction ratio of approximately 10:1 is desirable although a higher ratio may be desired for slower speed regulation pitch changes.

The low speed intermediate gear 232 pivoted on spindle 202, as will be observed from Fig. 11 drives clutch-containing gears 236 and 238 rotatably mounted upon the previously referred to spindles 204 and 206. Each of the gears is adapted through selective actuation of the clutches 237 and 239 to drive the pinions 210 in one direction or 212 in the other direction to rotate the internal gear ring 178 slowly in either direction at about one-tenth of the rate of speed derived from the clutch-containing gears 198 and 200.

Each of the clutch supporting spindles 204 and 206 are alike and the clutches mounted thereupon and the gears 210 and 212, except for the direction of rotation, are likewise the same in each case. Reference to Fig. 12 disclosing the gears 198 and 236 and contained clutches 199 and 237 mounted upon the spindle 204 accordingly will suffice for a description of the remaining clutches 201 and 239 on the spindle 206. Referring to Fig. 12, the spindle 204 is shown as extending between the plate 22 and the rear casing wall 24. Rotatably mounted upon the spindle 204, is a sleeve 248 having integrally formed therewith the gear 210 previously described as meshing with the external teeth 208 upon the control gear ring 178. The sleeve 248 is provided with roller bearings 250 rolling upon the spindle 204 located beneath the gear teeth 210. The sleeve 248 extends over the spindle 204 and is provided with a body portion 252 having exterior clutch disc engaging splines 254. The extreme end of the sleeve 248 is provided with an exterior bearing surface in engagement with an internal bearing sleeve 258 supported within a shoulder 260 formed integral with the spindle 204. The sleeve 248 is provided with a cylindrical external bearing sleeve 262 for rotatably receiving the gear 198, and the shoulder 260 is also provided with an exterior cylindrical bearing sleeve 261 for rotatably receiving the gear 236. Each of the gears 198 and 236 have peripheral facing sleeve-like extensions 264 and 266 having internal clutch plate engaging splines 268. Sets of clutch discs 214 and 216 located within the respective gear sleeve extensions 264 and 266, having alternate discs provided with internal and external lugs interengaging with the splines 254 and 268 are each positioned between annular pistons 270 and 271, and annular thrust discs 272 and 273, the latter being held within each of the splined sleeves 264 and 266 by lock rings 274. The inner annular edges of the thrust discs 272 and 273 bear against a common rectangular cross-section ring 276 freely rotatable with respect to the splined portion 252 of the sleeve 248. Each of the pistons 270 and 271 is received in annular cylinders 278 and 280 having external cylindrical walls 279 and 281 formed in the respective gears 198 and 236 immediately beneath the gear teeth, and to one side of the internal splines 268.

Fluid under pressure is delivered (see Fig. 12) to the cylinder 278 from a port 283 in the end wall 24, through an aperture 282 in the spindle 204 and thence through an elemental groove 284 arranged in the plug member 286 arranged within the spindle 204. The groove 284 terminates adjacent an aperture 288 in the spindle 204, the aperture lying approximately in the plane of the gear 198. Upon either side of the aperture 288 and upon the exterior of the spindle 204 are arranged spaced shoulders 290 and 292 defining an annular space between the sleeve 248 and the spindle 204 in which oil under pressure is confined. The sleeve 248 is provided with one or more radial ports 294 leading into an annular exterior groove 296 from whence fluid may flow through a series of ports 298 arranged in the bearing sleeve 262, into an annular groove 302 in the hub of gear 198, the latter groove being connected with the cylinder 278 through one or more ports 304.

Similarly the cylinder 280 in the gear 236 may be supplied with fluid under pressure from the end wall duct 306 leading through an aperture 308 in the spindle 204, to a short elemental channel 310 in the plug member 286 from whence fluid is distributed through a radial port 312 in the bearing shoulder 260 of the spindle 204, the port leading into an annular groove 314 in the exterior cylindrical bearing face of the bearing shoulder. The bearing sleeve 261 is provided with one or more apertures 318 in alignment with the annular groove 314 through which fluid may pass into the annular groove 320 in the cylindrical bearing face of the gear 236 which groove is connected to the cylinder 280 through one or more ports 322.

Since it will be observed that the gears 198 and 236 are rotating continuously although at differing speeds, whereas the gear 210 and its sleeve 248 are normally stationary except when effecting changes of pitch, it is desirable to maintain constant lubrication of the clutch plates 214 and 216 when disengaged. To this end, the oil pressure lines 283 and 306 are normally maintained under low pressure and a lubricating pressure fluid is employed. When the pressure is relatively low in the line 283, oil is permitted to flow from the elemental channel 284 into a central chamber 324 in the plug 286, and thence through axial and radial bores 326 in a piston 328, into a radial aligned bore 330 extending through the plug 286 and spindle 204 and into an annular space defined by the spindle, the shoulders 292 and 260 and the splined portion 252 of the sleeve 248. Thence the lubricant is permitted to escape radially and outwardly into the space occupied by the clutch discs 214 and 216 through a plurality of ports 332. The piston 328 is maintained in the position shown with the port aligned with the radial port 330 by reason of a compression spring 334 centered between the shouldered end 336 of the piston 328 and a spring backing member 340 held in a bore 342 of the plug member 286 by a transverse pin 344. The central chamber bore 324 is slightly reduced in diameter from that of the bore 342 to provide a shoulder 346 against which the piston shoulder 336 may bear to limit movement thereof, and the bore 342 is vented as at 343. Movement of the piston in the opposite direction is limited by the spring centering pin abutment 348 formed upon the spring backing member 340. By correlating the tension of the spring 334 with respect to the constriction of the radial port 330, the port 320 and the area of piston 328, upon a substantial increase in oil pressure within the central bore 324, the piston will be promptly moved against the compression of the spring 334 to the limit of its movement as established by the pin 348, to cut off the flow of fluid through the lubricating channel 330 and the clutch discs 214 and 216. Thus, when it is desired to actuate the clutch 214, it is only necessary to supply the clutch cylinder 278 with fluid under a substantially increased pressure whereupon the piston 328 shifts, confining pressure fluid flow to cylinder 278. When the pressure is relieved and the piston 328 restored to lubricating position, a continuous stream of lubricant flows between the discs, escaping around the peripheral edges of the thrust discs 272, 273, into the surrounding space.

While the worms 56 and worm wheels 54 are irreversible, and would tend to hold the pitch of their respective blades, it is desirable to absolutely fix pitch against gradual creepage due to vibration and the high centrifugal blade twisting moments usually present. For this purpose a hydraulic disc brake generally denoted by the reference character 500 is provided. As illustrated in detail in Fig. 13 the brake constitutes a unitary assembly centered upon a spindle 502 extending from the front plate 22 to the rear wall 24. The spindle is provided with a rotatable sleeve 504 mounted upon a bearing 506 rolling on the spindle 502, and a thrust bearing 508 surrounding the sleeve and retained in a flanged member 509 centered upon the rear wall 24. Gear teeth 512 in the plane of the bearing 506 engage the external teeth 208 of the annular gear ring 178. It will be understood that by holding the gear ring 178, the blade pitch will be fixed by reason of the intergearing 177 heretofore described.

The sleeve 504 is provided adjacent the bearing 508, with a combined brake disc carrying ring and annular stationary piston 514 splined to the sleeve as at 516. The housing 518, secured to the rear wall 24 is provided with internal brake disc engaging splines 520, which together with the splines 522 of the ring 514, engage alternate discs 524, located between a pressure plate 526 and an annular brake applying piston 528. The U-sectioned piston 528, filled with light plastic 529, is adapted to move in an annular cylinder formed by a cylindrical flange 530 on the bearing member 509, and a cylindrical ring 532, partially located in the housing 518, partially located in the rear wall 24, and abutting against the splines 520. The pressure plate 526, held non-rotatable by splines 520, is provided with an internal cylindrical wall 534, engaged by the annular rotary, but axially fixed, piston 514. The inner end of the pressure plate is formed into a sleeve 536, which is embraced slidably by a slip clutch carrying sleeve 538, having an internal flange 540 against which a packing 541 in engagement with the gear sleeve 504 may bear. The sleeve 538 rotates with the gear 504.

Surrounding the slip clutch sleeve is a centrifugal ball driving sleeve 542 journaled in the end wall 519 of the housing 518, on bearings 544.

The sleeve is geared through teeth 546, and idler gear 548 with the power take off gear 194, so that rotation of the sleeve 542 is proportional to propeller shaft speed. Freely splined on the inner end of the ball driving sleeve is an annular concave wedge sectioned ball race member 550, upon which sets of balls 552 and 554 roll, the sets bearing against a thrust ring 556 in the end wall 519, and against the rear face 558 of the pressure plate 526. The sets of balls are held in uniformly angularly spaced relation by freely rotating retainers 560, which permit the balls to move radially in response to centrifugal force when they are driven by the race member 550.

From the foregoing, it will be observed that bodily rotation of the balls about the axis of the brake unit moves the balls radially outward, and they exert pressure upon the pressure plate 526 tending to apply the brake by squeezing the discs 524, the piston 528, being limited in its rightward movement by engagement with the housing 24 which acts as a reaction member. This centrifugal force varying with rotation speed may act to fix the pitch of the blades, the braking force increasing with propeller speed, so that the brake holding power may always exceed that required to offset the blade centrifugal twisting moments which likewise increase with speed.

The centrifugal brake applying force, under normal circumstances, is curbed through the application of fluid pressure in the space between the piston wall 514 and the cylinder formed by the pressure plate and the cylindrical wall 534, fluid pressure being admitted for this purpose through the hollow 562 of the spindle 502, and ports 564 in sleeve 504. As will be described, such fluid pressure is obtained from the source of fluid power employed for operation of the brake and clutches, which sources varies in pressure with propeller speed, the pressure however being more than adequate under normal operation to hold the pressure plate 526 to the left, against the housing shoulder 566. Upon failure of such source, however, it will be observed that centrifugal action will apply the brake except at a speed below, for example, 150 to 200 revolutions per minute of the propeller shaft, at which time the force of spring 568 is sufficient to hold the pressure plate against the shoulder 566.

To positively position the externally splined plates of the clutches and brake uniformly, when released, and to assist instantaneous release when the piston pressure is relieved, light annular resilient rings 360 (Figs. 12a), wavy in form, may be positioned within alternate adjacent plates between the clutch or brake casings, such as 264 in Fig. 12 and 518 in Fig. 13. Such rings are wavy or sinuous axially of the clutch, and resiliently bear against the adjacent alternate plates at spaced staggered points, with a pressure sufficient to assist instantaneous plate release.

When the fluid pressure supply is normal, the slip clutch carrying the sleeve 538 is urged to the left against the action of spring 570, so that the clutch plate or flange 572, with its conical slip recesses 574, is moved clear of the conical stud heads 576 carried on the otherwise free running gear 578, geared in any suitable manner to an auxiliary reversible feathering motor 580 having a magnetic brake 582 (see also Figs. 14 and 15). The shape of the conical heads of studs 576, and slip recesses 574, and the tension of spring 570 are such as to permit slippage whenever the torque exceeds that for which the motor 580 is designed. The clutch is normally freely disengaged by the fluid pressure action upon the sleeve 538 through the piston forming flange 540 and packing 541. The clutch disc 572 is splined for rotation with the gear 512 to drive the same by means of apertures 584 sliding on extensions 586 of the gear teeth 512, and reaction of the gear 578 is absorbed by the thrust bearing 588, bearing against the end of the housing extension 590.

The system as a whole is such as to be controlled through manually operated electrical switches shown in Fig. 15, there being provided a propeller reverse switch 600, a propeller feathering switch 602, and a selector pitch increase or decrease, or governor control switch 604. Save for these three controls, action of the system is substantially automatic, as will appear from a consideration of Figs. 14 and 15 conjointly showing the hydraulic and electric control system.

Actuation of the clutches 199, 201, 237 and 239 is controlled by solenoid valves 702, 704, 706 and 708, so connected to the pressure source that the brake is applied when the solenoid valves are de-energized and the clutches released. Fluid under pressure, under these circumstances, from the gear pump 710, the drive of which pump will be described, is conducted through pressure conduit 712, through each of the valve interconnecting conduits 714, 716, 718 and thence to the annular brake actuating piston 528 through conduit 720. Movement of any one of the balanced valve plungers 722, 724, 726 or 728 to the left through energization of its respective solenoid against biasing springs 731 immediately connects the brake conduit 720 with the sump conduit 730, through the valve so operated, and one or more of the interconnecting valve passages 732, 734 and 736. Upon moving any one of the valves to the left, one of the clutch conduits 723, 725, 727 or 729 is connected to pressure conduit 712 through the respective valve that has been actuated, directly in the case of valve 702, and through one or more of the interconnecting conduits 714, 716 and 718, in the case of the other valves. The valves 702, 704, 706 and 708 are so arranged that one valve takes precedence over other valves in the order named, so that in no event may more than one clutch be actuated, and then only upon release of the brake.

The unit housing 700 (Fig. 14) contains the gear pump 710 previously mentioned, and several additional hydraulic control devices. Upon a boss at the upper left hand corner of the housing 700 a gear 744 is shown, this gear being driven from the power gear 194. Gear 744 is an idler and meshes with another gear 737 secured to a shaft 737' upon which one of the gears of the pump 710 is mounted. Thus, pump 710 is driven by the power gear 194. The pump is provided with an inlet 739 and the shaft 737' is provided with centrifugal valves 742 and 740, connected to the pump outlet through shaft conduit 743, the former (742) relieving the pressure of the gear pump 710 at all speeds below 200 R. P. M. and the latter (740) controlling the pressure developed at all speeds above 200 R. P. M., so that pressure in the conduit 712 increases as the speed of the propeller and pump increases, commencing at 200 R. P. M. of the propeller shaft. To accomplish this result, the valve spring 781 of the valve 742 holds the valve sleeve 783 radially inward until a speed of 200 R. P. M. is attained; after which centrifugal force on the sleeve moves the valve outwardly and holds the valve closed. The valve spring 785 of the valve 740 holds the sleeve 789 radially outward, together with centrifugal force until fluid pressure develops in the pump output 743 and acts on the outer surface of a flange of the wall 791 and forces the sleeve inwardly for relief of excess pressure between the sleeve end and the flange end of the rotary valve stem. The pressure is thereby maintained as a function of the centrifugal force and of the rotational speed. As shown, the valve 740 is open and the valve 742 is closed, the propeller being assumed as rotating at a substantial speed.

The chamber 746 in housing 700 is supplied with hydraulic fluid from a scavenger scoop 748 extending into the annular channel 750 formed around the periphery of the bulkhead 141 (see Figs. 3 and 12) and from an auxiliary scavenger gear pump 752 driven by shaft 737', picking up fluid 754 from within the stationary casing, lost through seals, and the lubrication channels in the various clutches, etc. The chamber 746 is also supplied from a supply line 755 leading to the reservoir 756 (Figs. 3, 12 and 14) through a shut-off valve 758 held open against a spring 759 upon the establishment of pressure in the conduit 712. This valve 758 closes if pressure in line 712 becomes negligible, preventing dumping of reservoir contents into the assembly 700. The pressure from line 712 acts on a piston embracing the spring 759, the piston cavity being isolated from the valve portion connected to the reservoir and the line 755. The supply line 755 enters the chamber 746 at a radius from the center so as to be influenced by the level within the chamber established by centrifugal action of the vane effect of the casings of valves 740 and 742 and other vanes as may be desired and the cylindrical filter screen 745 rotating therewith, the liquid building up through such action in an annular layer within the chamber 746. A valve 788, normally pressed open by a light spring 760' behind a piston 760, admits oil from the chamber 746 to the line 730 to feed lubricant to the clutch and brake parts. When centrifugal pressure in chamber 746 exceeds a value of about 5–10 pounds per square inch, this pressure will act on piston 760 to close valve 788, thereby limiting the maximum pressure which may exist in the line 730. This maintains a positive pressure in the sump line sufficient to maintain fluid in all of the ports and chambers, and particularly the clutch discs by action of the valve 328 (see Fig. 12). The centrifugal chamber is such as to filter the liquid, and remove entrained air as well as to provide a base source, centrifugally maintained independent of the flight aspect of the airplane, from which the pump inlet 739 may at all times receive pressure fluid.

It will be observed that the conduit 712 is at all times connected with the brake pressure plate cylinder 534 and piston, so that the centrifugal force of the balls 552 and 554 are restrained from applying the brake as long as the pressure in conduit 712 is normal as determined by the speed of the centrifugal speed responsive pressure establishing valve 740. At the same time, a fluid pressure feather motor switch 770 is maintained open so long as pressure exists within the line 712.

Assuming the limit switch 610 being positioned at approximately 50°, corresponding to the blade angle of the propeller blades, the contactors 620, 622, 624, 626, 628, 630, 632, 634, 636, 638 and 640, will be located with respect to the corresponding drum carried contact bars as shown. The selector switch 604 is connected to the governor 642, which may be of any desired form. Suitable governors are well known; those disclosed in Patent No. 2,449,452, issued September 14, 1948, or No. 2,433,321, issued December 31, 1947, are suitable. Upon the governor calling for an increase in speed, current from battery 644 passes through the feathering switch 602, shown in non-feathering position, the governor contact 646, thence to engine drive ratio switch 648, shown in the high ratio position, thence through limit switch contact 634, to slow decrease valve solenoid 706, thence through closed contacts 650 to ground 652. The pitch will then be decreased, and the speed allowed to increase assuming a fixed engine throttle. Had the ratio switch been in low ratio position, the path of current flow would have been through contacts 636. If engine speed requires decreasing, governor contact 654 is closed, and a path of travel is established through contacts 628 and 626 to the slow increase pitch valve solenoid 708, switch contacts 650 and ground 652. It will be understood that the engine drive ratio switch shifts with the establishment of a low ratio or high ratio between propeller and engine.

If it be desired to reverse pitch during the normal governor operation of the system, switch 600 is moved to the right to establish a circuit through limit contacts 640, energizing fast rate decrease pitch solenoid valve 704 and the corresponding clutch. The circuit is automatically broken when the pitch reaches approximately minus five degrees. Prior to the breaking of the circuit, the governor contact 646, formerly completing a circuit through limit switches 634 and 636, to the slow decrease solenoid 706, can only complete a circuit to the slow increase solenoid valve 708, through contacts 638 established independent of the ratio switch control, and preferably immediately subsequent to the opening of contacts 640. Thus the action of the governor is automatically reversed in its control over the pitch of the blades to correspond with the reversal of pitch. Had the governor contact 654 been closed, when the limit switch and blade angle reached —5°, or prior thereto, but beyond the opening of limit switch 628, at approximately 0° pitch, a circuit would be established through contacts 622 and 624, and slow decrease solenoid 706 would then be actuated, the effect of which is to increase the negative pitch. If limit switch 628 is closed when contact 654 is closed, and contacts 622 and 624 are closed also, while solenoid valve 708 is thus energized, solenoid valve 706 takes precedence thereover, likewise again reversing the action of the governor in its pitch changing control over blade pitch and causes an increase in negative pitch. Until —5° is reached, valve 704 takes precedence over valves 706 and 708.

Thus it will be seen that over-speeding in the negative pitch range is prevented by governor action, acting to increase the negative pitch, which requires rotation of the blades in their sockets in the same direction as would decrease pitch and cause an increase in speed, were the blades within the forward or normal pitch range. It will also be seen that governor action to increase speed, by reducing the negative pitch, in the reverse pitch range is limited to the short closed circuit range provided by the limit contact 638, it being often desirable for the pilot to increase the speed through manipulation of the throttle or other control means, subject, however, to the governor controlled limit on maximum speed through contacts 622 and 624. It will also appear that since reverse pitch is effected at a fast rate of 45° of blade angle change per second until —5° is attained, there is little danger of the engine over-speeding in passing through the windmilling and zero pitch range, and that the governor promptly establishes a reverse pitch sufficient to provide an adequate load at the speed limit set by the governor.

Limit contacts 626 are such as to prevent manual operation of selector switch 604 or the governor from increasing pitch beyond a preset angle such as 60°, and contacts 634 and 636 determine the lower pitch limit which can be effected by the governor or the selector switch, the limit varying with the position of the ratio switch, it appearing that with the lower ratio, a lower or different limit may be provided. Thus unless the reverse pitch switch 600 be placed in reverse pitch position, the normal blade angle limits are in operation and control and as soon as reverse pitch is called for, a fast rate of change is effected, and the controls therefore automatically reversed as the pitch passes through a position approximately zero pitch and into the reverse range.

To feather the propeller, the feather switch is moved to the left, breaking all existing circuits to the battery and establishing a circuit through limit contacts 620, fast increase pitch solenoid valve 702, contacts 650 and ground. Should propeller rotation decrease below 200 R. P. M., for example, to approximately 175 R. P. M., and fluid pressure discontinued, contacts 650 open, and contacts 670 and 672 close, the former completing a circuit through the pitch increase field 674 of feathering motor 580, at which time the motor brake 582 is released. It will be apparent that with the discontinuance of pressure causing the closing of contacts 670, slip clutch 572 is moved to the right by the spring 570, so that the feathering motor drives break gear 512 to shift the ring gear 178 and thus slowly effects feathering. When feather position (90°) is reached, contacts 620 open.

To unfeather, the feathering switch 602 is restored to the position shown. There being no fluid pressure because of the non-rotating propeller, switch contacts 672 are closed and either by governor action through closure of contact 646 or movement of selector switch 604 to the increase speed position, the motor 580 is energized through the unfeather field 678 and either contacts 634 or 636. As soon as the propeller windmills at 200 R. P. M. or more, fluid pressure is established, switch 770 is shifted and contacts 650 close, whereupon the previously described conditions obtain. When the propeller is stationary, it will be seen that the blade pitch may be changed to any desired angle by the feather switch, within the +90° limit imposed by contacts 620, and the limits imposed by limit switches 634 and 636. By closing the reverse pitch switch 600, auxiliary pitch changing may be effected to the limit of limit switch 640. Under normal power operation the maximum negative pitch is limited by limit switch 622. Should the source of hydraulic pressure fail for any reason, the centrifugal force of the balls 552 maintain the brake engaged, thereby holding the pitch at the angle existing when the failure occurred, except that if the speed be reduced to below 200 R. P. M., the feathering motor may be employed to feather the blades or otherwise alter pitch, so long as the speed is below 200 R. P. M. and the centrifugal brake is released.

It will be readily apparent from a consideration of the foregoing, that a power transmission unit of relatively short axial length has been provided, supported from the propeller shaft, which unit is substantially independent, except for electrical control connections. The clutch, brake and gear reduction units, mounted upon spindles 202, 204, 206 and 502, are unitary in nature, and readily replaceable and removable for inspection by merely separating the plate 22 and back wall 24. The pump 700, and limit switch drum 610 may be arranged in the assembly, to the right of gear 210. Also the quantity of lubricant and pressure fluid is maintained at a minimum.

With the hub mounting of the stationary portion of the apparatus, alignment is accurately maintained for sealing purposes, between the bulkhead 141, and the housing shell 482. A seal, composed of a resilient plastic ring 480, urged outwardly by a compression garter spring 479, bears, through a rubber circular section ring 481, against the surface 477 of the bulkhead 141. Any leakage is returned centrifugally to the channel 750 by means of the groove 484, and one or more inclined ports 486, the channel 750 being scavenged (see Fig. 12). While the housing detail may be varied to suit requirements, it will be seen that plate 22 is supported through the intergearing bearings of ring 172, and is joined with housing wall 482 in any suitable manner, to form an enclosure therewith.

The assemblage is such as to also facilitate the transfer of hot gases for de-icing purposes from a stationary manifold to the rotating spinner as is generally illustrated in Fig. 1. The stationary housing is shown extended as at 490, and provided with a seal 491, cooperating with a flange 492 on the bulkhead 141. Such seal may comprise a ring broken into a plurality of segments centrifugally distributed against, and adapted to rotate with the flange 492. A transfer chamber 493, connected with a hot gas supply duct 485 is thus provided. One or more conduits 494, located between blades and supported by the bulkhead 141, and forward plate 495, connect the transfer chamber with the nose spinner chamber 496, formed by such streamlined spinner shell as may be desired, cooperating with and supported by the plate 495. An inboard extension of such spinner shell may be supported by the peripheral edges of bulkhead 141 and plate 425 and the overall shape of such spinner shell may depend upon whether the propeller is employed as a tractor or pusher as will be readily understood in the art.

Hot de-icing gases may thus flow from the transfer chamber 493, through the conduits 494, to the nose spinner chamber 496, from where it may enter the hub sleeve 497, and be distributed outwardly into the hollow blades, as indicated by the arrows. Each blade may be provided with exhaust ports at their tips, as will be understood in the art.

In the modification illustrated in Figs. 16, 17 and 18, the planetary speed reducer has been replaced by spur gearing, without substantial change in the general organization of the parts. As shown driving gear 194', keyed to the propeller hub sleeve 26, engages a relatively large gear 800, rotatably mounted upon a spindle 802 supported between fore and aft stationary housing plates 804 and 806. Meshing with the gear 800 is an idler pinion 808, in turn driving a clutch driving gear 810 rotatably mounted upon a spindle 812 supported between the fore and aft housing plates 804 and 806. A second clutch driving gear 814 journaled upon a spindle 816 similarly supported between the housing plates 804 and 806 is driven in a reverse direction from gear 810 through idler gears 818 and 820. Each of the idler gears 808, 818 and 820 are suitably journaled upon shafts supported from the housing wall 804 and the entire train of gears so far thus described drives the clutch driving gears 810 and 814 at a speed substantially double that of the gear 800 driven from the propeller shaft.

Rotatably mounted on the spindle 812 and 814 are driving gears 210' and 212' each of which are drivably connected to a sleeve extending into hydraulic disc clutches 822 and 824, and 826 and 828 respectively, the general construction of which may be similar to clutches 199, 201, 237 and 239 of the previous modification described. The gears 210' and 212' are adapted to drive the external teeth 200 of the ring gear 178 forming a part of the intergearing 177 to thereby fix or effect changes in pitch through the relative rotation of the hub carried gear 140 and blade pitch changing gearing including the gears 132 and shafts 136.

In order to provide a moderate rate of pitch change suitable for controlling engine speed by varying propeller pitch in small increments, the gear 800 is connected through a clutch 830 to a relatively small pinion 832 driving, through an idler 834 pivotally supported from the housing plate 806, the relatively large inter-meshed gears 836 and 838 rotatably mounted upon spindles 812 and 814, for reverse rotation. It will be understood that the gears 836 and 838 drive the driving members of the clutches 824 and 828 and that the gears 810 and 814 drive the driving members of the clutches 822 and 826. It will also be understood that the driven members of clutches 822 and 824 drive the pinion 210' and the driven members of clutches 826 and 828 drive the pinion 212'. The relative diameters of the gears 832 and 836 are such as to produce a reduction ratio in the order of five to one whereas the ratio of gear 800 to gear 810 is one to two, so that the driving members of the clutches 822 and 826 rotate at speeds approximately ten times that of the driving members of clutches 824 and 828.

The clutches 822, 824, 826 and 828 are preferably controlled by hydraulic pressure as hereinbefore set forth and the clutch 830 may be similarly controlled, that is by the application of hydraulic pressure thereto. If it be desired to increase pitch at a rapid rate, it is sufficient to actuate the clutch 822 for such length of time as is required to produce the change of pitch desired. Similarly to decrease pitch at a fast rate the clutch 826 may be actuated. When it is desired to increase pitch at a relatively slow rate, it is essential that the clutch 830 be engaged together with clutch 824 and when it is desired to reduce pitch at a relatively slow rate the clutches 828 and 830 are engaged. It will of course appear that the clutch 830 may remain engaged during all of the pitch changing operations, but in order to reduce friction and wear and tear, it may be desirable to cause the clutch 830 to be released at all times except when an increase or decrease in pitch at a slow rate is desired. In order to hold pitch, the clutch 830 may be disengaged and the clutches 824 and 828 may be simultaneously engaged whereby due to the reverse rotation of gears 836 and 838, and the engagement of gears 212' and 210' with the gear teeth 208, the ring gear 178 will be locked. By means of the arrangements described it will be seen that the requirement of an additional braking device is eliminated by the system described, there being required merely an additional clutch 830 of a relatively light capacity owing to the fact that relatively slow rates of pitch change are transmitted through such clutch at a relatively low torque.

In the modification disclosed in Figs. 20 and 21 some simplification is provided in the number of gears required and the total number of clutches employed. It will be seen, however, that the general arrangement has points of similarity to the previous forms described. The hub driven gear 194' from which power is derived meshes with a large gear 900 rotatably mounted upon a spindle 902 supported between fore and aft stationary housing members 904 and 906. Through the selective actuation of the hydraulic clutch 908 or 910 the large gear 912 or the small gear 914 may be drivably connected to the power driven gear 900. The small gear 914 drives through an idler gear 916, supported from the support plate 906, a pair of reversely rotating clutch driving gears 918 and 920 centered upon spindles 922 and 924. The gear 912 meshes with an idler gear 926 supported from the forward housing plate 904 and meshes with a gear 928 rotatably supported upon the spindle 922, the gear 928 and 916 being drivably connected together. The gears 210' and 212', rotatably mounted upon the spindles 922 and 924 are adapted to be driven by the actuation of either hydraulic clutch 930 or 932 and thereby drive the ring gear 178 from whence the inter-gearing 177 and gear 140 and the hub carried pitch changing gearing effects changes of pitch as desired.

It will appear that upon actuation of the clutch 908 that the gears 918 and 920 will be reversely driven at a relatively low rate of speed and that by actuation of either clutch 930 or 932 a pitch increase or a pitch decrease may be effected at a relatively slow rate. On the other hand, if clutch 908 be released and clutch 910 engaged, the gear 928 will be rotated at a relatively rapid rate, thereby reversely rotating gears 918 and 920 at a relatively rapid rate. Through actuation of either one of the clutches 930 or 932, a pitch increase at a rapid rate or a pitch decrease at a rapid rate can be effected. It will therefore be apparent that one of clutches 906 and 908 must be actuated simultaneous with one of clutches 930 or 932 in order to effect a desired pitch change. By releasing both clutches 908 and 910 and actuating both clutches 930 and 932 simultaneously, a braking action is effected which results in holding the ring gear 178 against rotation, thereby fixing the pitch.

In order to conveniently actuate the various clutches in combinations of two, to effect the various operations described, there is shown in Fig. 21 an electromagnetic hydraulic control valve arrangement suited to this purpose. A source of high pressure fluid is provided by a gear pump 840 normally driven by the propeller shaft. High pressure fluid is supplied to the valves 942, 944, 946 and 948, the valves being adapted upon energization of the solenoids 950, 952, 954 and 956 to be moved from the position shown in valve 948 to the dotted line position whereupon high pressure fluid is directed to the clutch. It will appear that the valve 942 controls the operation of the clutch 908 and the valve 944 controls the clutch 910. The valves 946 and 948, respectively, control the clutches 930 and 932. To effect a low rate of pitch increase, the manual control 958 is moved to establish a circuit from the battery 961 through both solenoids 950 and 954. To establish a low rate of decrease the manual control 960 may be actuated to establish a circuit through the solenoids 950 and 956. Similarly, for a high rate of pitch increase, a circuit is established through control 962 in solenoids 954 and 952, and for a high rate of pitch decrease, control 964 may be actuated to establish a circuit in solenoids 956 and 952. In order to effect a braking action, the control 966 may be actuated to establish a circuit in solenoids 954 and 956.

It will be observed in the various modifications, that the transmission of pitch changing torque to the hub carried gears 138, at the high torque high speed level is accomplished through gearing located closely adjacent to the plane of the intergearing 177, in "pancake" fashion whereby minimum force couples are introduced, and the relative parts may be correspondingly lightened. Alignment of the inter-meshing gears is thus improved and the structures as a whole are such as to result in low overhang of the propeller shaft.

Although several modified forms of the general system have been illustrated and described, it is to be understood that the invention is not limited to such modifications, but may be embodied in many and various equivalent forms. As many other changes in construction and arrangement of parts may be made without departing from the spirit and scope of the invention, as will be apparent to those skilled in the art, reference will be had to the appended claims for the definitions of the limits of the invention.

I claim:

1. In a variable pitch propeller, a hub, blades swivelly mounted on said hub, a coaxial sleeve carried by said hub, and rotatable with respect to said hub, and means for increasing or decreasing the pitch of said blades in response to relative movement in one direction or the other of said sleeve with respect to said hub, planetary gearing comprising sun gears drivably connected to said sleeve and hub, planet gears therefor rotatable about said hub axis in unison, a stationary ring gear associated with said sleeve sun gear and its respective planet gears, a rotatable ring gear associated with said hub sun gear and its respective planet gears, means selectively drivably connectable with said hub for rotating said last named ring gear in opposite directions, selectively operable means to free or hold said last named ring gear for or against rotation respectively, and means for selectively setting said drivably connected means to rotate said last named ring gear in one direction or the other and concurrently for freeing said ring gear holding or freeing means to allow rotation thereof.

2. In a variable pitch propeller, a hub, blades swivelly mounted on said hub, a coaxial sleeve carried by said hub, and rotatable with respect to said hub, and means for increasing or decreasing the pitch of said blades in response to relative movement in one direction or the other of said sleeve with respect to said hub, planetary gearing comprising sun gears drivably connected to said sleeve and hub, planet gears therefor rotatable about said hub axis in unison, a stationary ring gear associated with said sleeve sun gear and its respective planet gears, a rotatable ring gear associated with said hub sun gear and its respective planet gears, means selectively drivably connectable with said hub for rotating said last named ring gear in opposite directions and at two different rates of speed, selectively operable means to free or hold said last named ring gear for or against rotation respectively, and means for selectively setting said drivably connectable means to rotate said last named ring gear in one direction or the other at two different rates of speed and concurrently for freeing said ring gear holding or freeing means to allow rotation thereof.

3. In a variable pitch propeller, a hub, blades swivelly mounted in said hub, means including a member rotatable relative to said hub for effecting changes of pitch, two planetary gear trains concentric of said hub and arranged side by side, and each comprising a sun gear, planet pinions and a ring gear, a common carrier for said planet pinions, one of said sun gears being connected to said rotatable member, and the other to said hub, means for restraining rotation of one of said ring gears, holding means for normally holding said other ring gear and operable to free it for rotation, means for driving said other ring gear in either direction including a power gear driven by rotation of said hub, and means for concurrently actuating said holding means, to free said ring gear and to engage said driving means for rotating said ring gear in one direction or the other.

4. In a variable pitch propeller, a hub, blades swivelly mounted in said hub, means including a member rotatable relative to said hub for effecting changes of pitch, two planetary gear trains concentric of said hub and arranged side by side, and each comprising a sun gear, planet pinions and a ring gear, a common carrier for said planet pinions, one of said sun gears being connected to said rotatable member, and the other to said hub, means for restraining rotation of one of said ring gears, holding means for normally holding said other ring gear and operable to free it for rotation, means engageable for driving said other ring gear in either direction including a power gear driven by said hub, means for concurrently actuating said holding means to free said ring gear and to engage said driving means for rotation of said ring gear in one direction or the other, a frame for supporting said restrained ring gear, said driving and holding means, and means for supporting said frame from said hub, and means for preventing rotation of the frame.

5. In a variable pitch propeller, a planetary intergearing for controlling pitch of the blades of the propeller, a shaft, a pair of planetary gear trains each comprising a sun gear, a ring gear and a set of planet pinions engaging both gears, means for driving one of said sun gears from said shaft, means for controlling blade pitch driven from the other sun gear, a common carrier for said planet pinions of both planetary trains, a bearing for said carrier on said shaft, a rotationally fixed ring gear engaging one set of planet pinions, means for journalling said fixed ring gear on said carrier, means for driving said other ring gear in one direction or the other to cause rotation of said other sun gear relative to said shaft in one direction or the other, means operable to hold said other sun gear against rotation when said driving means is not operating, and a non-rotatable housing for said last named driving means secured to said fixed ring gear and supported from said carrier bearings.

6. In a variable pitch propeller, a planetary intergearing for controlling pitch of the blades of the propeller, a shaft; a pair of planetary gear trains, having a planet gear carrier common to both trains, a gear keyed to the shaft, a normally non-rotative gear, a control gear rotatable in one direction or the other, and a gear normally rotating with the shaft but adapted to be advanced or retarded in order to vary propeller pitch in response to control gear rotation said gears being engaged with the planet gears of said carrier; power gearing driven by said shaft for selectively rotating said control gear in one direction or the other, means operable to hold said control gear against rotation when it is not being driven by said shaft driven gear, and non-rotatable means for supporting said power gearing from said shaft, said means including two bearings between said supporting means and carrier and between said carrier and shaft.

7. In a variable pitch propeller, a planetary intergearing for controlling pitch of the blades of the propeller, a shaft; a pair of planetary gear trains, having a planet gear carrier common to both trains, a gear keyed to the shaft, a normally non-rotative gear, a control gear rotatable in one direction or the other, and a gear normally rotating with the shaft but adapted to be advanced or retarded in order to vary propeller pitch in response to control gear rotation said gears being engaged with the planet gears of said carrier; power gearing driven by said shaft for selectively rotating said control gear in one direction or the other, means operable to hold said control gear against rotation when it is not being driven by said shaft driven gear, and non-rotatable means for supporting said power gearing from said shaft, said means including two bearings between said supporting means and carrier and between said carrier and shaft, and a bearing between said shaft and said stationary means axially spaced from said carrier bearings.

8. In a variable pitch propeller, a planetary intergearing for controlling pitch of the blades of the propeller, a shaft; a pair of planetary gear trains having a planet carrier common to both trains, a gear keyed to the shaft, a normally fixed gear, a control gear rotatable in one direction or the other, and a gear normally rotating with the shaft but adapted to be advanced or retarded in order to vary propeller pitch in response to control gear rotation, said gears being engaged with the planet gears of said carrier; power gearing driven by said shaft for selectively rotating said control gear in one direction or the other, means operable to hold said control against rotation when it is not being driven by said shaft driven gear, non-rotatable means for supporting said power gearing from said shaft, said means including two bearings between said supporting means and carrier and between said carrier and shaft, a bearing between said shaft and said stationary means axially spaced from said carrier bearings, said power gearing including a gear fixed for rotation with said shaft, and located between said carrier and said axially spaced bearing.

9. In a variable pitch propeller, a propeller hub, a hub carried pitch varying gear adapted for rotation relative to the hub, blades swivelly mounted on the hub, spaced gears on the hub and off-set from the hub axis meshing with said pitch varying gear for varying the pitch of said blades in response to relative rotation of said gear, a pair of similar planetary gear trains arranged around said hub, said trains having a common planet carrier, a sun gear rotatable with said pitch varying gear and a sun gear fixed to said hub, and a ring gear fixed against rotation and a control ring gear, a power gear keyed to said hub closely adjacent said planetary gear trains, a non-rotating frame, rotatably supported from said hub and carrying said fixed ring gear, a pair of lay shafts in said frame arranged parallel with the hub axis, means lying substantially in the plane of said power gear for driving said lay shafts from said power gear at high speeds in reverse directions, means for driving said control gear from either of said lay shafts in one direction or the other, and means for driving said lay shafts at a low speed from said power gear in reverse directions, said means lying substantially in a plane spaced laterally from the plane of said power gear, on the opposite side from said planetary gear trains.

10. In a variable pitch propeller, a propeller hub, a hub carried pitch varying gear adapted for rotation relative to the hub, blades swivelly mounted on the hub, spaced gears on the hub and off-set from the hub axis meshing with said pitch varying gear for varying the pitch of said blades in response to relative rotation of said gear, a pair of similar planetary gear trains arranged around said hub, said trains having a common planet carrier, a sun gear rotatable with said pitch varying gear and a sun gear fixed to said hub, and a ring gear fixed against rotation and a control ring gear, a power gear keyed to said hub closely adjacent said planetary gear trains, a non-rotating frame, rotatably supported from said hub and carrying said fixed ring gear, a pair of lay shafts in said frame arranged parallel with the hub axis, means lying substantially in the plane of said power gear for driving said lay shafts from said power gear at high speeds in reverse directions, means for driving said control gear from either of said lay shafts in one direction or the other, and means for driving said lay shafts at a low speed from said power gear in reverse directions, said means lying substantially in a plane spaced laterally from the plane of said power gear, on the opposite side from said planetary gear trains, said frame being supported upon bearings acting through said carrier, and a bearing located beyond the last named plane.

11. In a variable pitch propeller, a propeller hub, a hub carried pitch varying gear adapted for rotation relative to the hub, blades swivelly mounted on the hub, spaced gears on the hub and off-set from the hub axis meshing with said pitch varying gear for varying the pitch of said blades in response to relative rotation of said gear, a pair of similar planetary gear trains arranged around said hub, said trains having a common planet carrier, a sun gear rotatable with said pitch varying gear and a sun gear fixed to said hub, and a ring gear fixed against rotation and a control ring gear, a power gear keyed to said hub closely adjacent said planetary gear trains, a non-rotating frame, rotatably supported from said hub and carrying said fixed ring gear, a pair of lay shafts in said frame arranged parallel with the hub axis, means lying substantially in the plane of said power gear for driving said lay shafts from said power gear at high speeds in reverse directions, means for driving said control gear from either of said lay shafts in one direction or the other, and means for driving said lay shafts at a low speed from said power gear in reverse directions, said means lying substantially in a plane spaced laterally from the plane of said power gear, on the opposite side from said planetary gear trains, said low speed driving means including a planetary reduction gearing arranged upon a third lay shaft in said frame.

12. In a variable pitch propeller, a propeller hub, a hub carried pitch varying gear adapted for rotation relative to the hub, blades swivelly mounted on the hub, spaced gears on the hub and off-set from the hub axis meshing with said pitch varying gear for varying the pitch of said blades in response to relative rotation of said gear, a pair of similar planetary gear trains arranged around said hub, said trains having a common planet carrier, a sun gear rotatable with said pitch varying gear and a sun gear fixed to said hub, and a ring gear fixed against rotation and a control ring gear, a power gear keyed to said hub closely adjacent said planetary gear trains, a non-rotating frame, rotatably supported from said hub and carrying said fixed ring gear, a pair of lay shafts in said frame arranged parallel with the hub axis, means lying substantially in the plane of said power gear for driving said lay shafts from said power gear at high speeds in reverse directions, means for driving said control gear from either of said lay shafts in one direction or the other, and means for driving said lay shafts at a low speed from said power gear in reverse directions, said means lying substantially in a plane spaced laterally from the plane of said power gear, on the opposite side from said planetary gear trains, said low speed driving means comprising a planetary reduction gearing arranged upon a third lay shaft in said frame, and said frame being supported upon bearings acting through said carrier, and a bearing located beyond the last named plane.

13. In a variable pitch propeller, a propeller hub, a hub carried pitch varying gear adapted for rotation relative to the hub, blades swivelly mounted on the hub, spaced gears on the hub and off-set from the hub axis meshing with said pitch varying gear for varying the pitch of said blades in response to relative rotation of said gear, a pair of similar planetary gear trains arranged around said hub, said trains having a common planet carrier, a sun gear rotatable with said pitch varying gear and a sun gear fixed to said hub, and a ring gear fixed against rotation and a control ring gear, a power gear keyed to said hub closely adjacent said planetary gear trains, a non-rotating frame, rotatably supported from said hub and carrying said fixed ring gear, a pair of lay shafts in said frame arranged parallel with the hub axis, means lying substantially in the plane of said power gear for driving said lay shafts from said power gear at high speeds in reverse directions, means for driving said control gear from either of said lay shafts in one direction or the other, and means for driving said lay shafts at a low speed from said power gear in reverse directions, said means lying substantially in a plane spaced laterally from the plane of said power gear, on the opposite side from said planetary gear trains, said driving means including a pair of clutches on each of said lay shafts, including a high speed clutch on each lay shaft, and a low speed second clutch on each lay shaft, and means for selectively operating any one of said clutches.

14. In a variable pitch propeller, a propeller hub, a hub carried pitch varying gear adapted for rotation relative to the hub, blades swivelly mounted on the hub, spaced gears on the hub and off-set from the hub axis meshing with said pitch varying gear for varying the pitch of said blades in response to relative rotation of said gear, a pair of similar planetary gear trains arranged around said hub, said trains having a common planet carrier, a sun gear rotatable with said pitch varying gear and a sun gear fixed to said hub, and a ring gear fixed against rotation and a control ring gear, a power gear keyed to said hub closely adjacent said planetary gear trains, a non-rotating frame, rotatably supported from said hub and carrying said fixed ring gear, a pair of lay shafts in said frame arranged parallel with the hub axis, means lying substantially in the plane of said power gear for driving said lay shafts from said power gear at high speeds in reverse directions, means for driving said control gear from either of said lay shafts in one direction or the other, and means for driving said lay shafts at a low speed from said power gear in reverse directions, said means lying substantially in a plane spaced laterally from the plane of said power gear, on the opposite side from said planetary gear trains, said driving means including a pair of clutches on each of said lay shafts, including a high speed clutch on each lay shaft, and a low speed second clutch on each lay shaft, means for selectively operating any one or a plurality of said clutches, and means for establishing precedence with respect to said clutches to prevent operation of more than one clutch at any one time.

15. In a variable pitch propeller, a propeller hub, a hub carried pitch varying gear adapted for rotation relative to the hub, blades swivelly mounted on the hub, spaced gears on the hub and off-set from the hub axis meshing with said pitch varying gear for varying the pitch of said blades in response to relative rotation of said gear, a pair of similar planetary gear trains arranged around said hub, said trains having a common planet carrier, a sun gear rotatable with said pitch varying gear and a sun gear fixed to said hub, and a ring gear fixed against rotation and a control ring gear, a power gear keyed to said hub closely adjacent said planetary gear trains, a non-rotating frame, rotatably supported from said hub and carrying said fixed ring gear, a pair of lay shafts in said frame arranged parallel with the hub axis, means lying substantially in the plane of said power gear for driving said lay shafts from said power gear at high speeds in reverse directions, means for driving said control gear from either of said lay shafts in one direction or the other, and means for driving said lay shafts at a low speed from said power gear in reverse directions, said means lying substantially in a plane spaced laterally from the plane of said power gear, on the opposite side from said planetary gear trains, said high speed driving means comprising a clutch on each lay shaft, and said low speed driving means comprising a second clutch on each lay shaft, means for braking the rotation of said control gear, and means for selectively operating any one of said clutches and brake.

16. In a variable pitch propeller, rotating driving means including a hub, blades swivelly mounted on said hub, means for deriving power from the rotation of the driving means for effecting changes in pitch operative for a range of rotation speeds above a fixed minimum speed, auxiliary means for effecting changes of pitch operative only at rotation speeds below said fixed minimum, and a speed responsive switch driven by said driving means for connecting for operation, said first or said auxiliary pitch changing means in accordance with the speed of said driving means.

17. In a propeller pitch changing mechanism, a variable pitch propeller, a planetary gearing for effecting changes of propeller pitch including a normally non-rotating gear adapted by its rotation in one direction or the other to effect an increase or decrease in pitch through said planetary gearing, and to maintain fixed pitch when held against rotation, a plurality of hydraulic couplings including a common fluid pressure source respectively operable to cause rotation of said gear in one direction or the other or for causing fixing of said gear against rotation, and means responsive to failure of said fluid pressure source for fixing said gear against rotation.

18. In a propeller pitch changing mechanism, a variable pitch propeller, a planetary gearing for effecting changes of propeller pitch including a normally non-rotating gear adapted by its rotation in one direction or the other to effect an increase or decrease in pitch through said planetary gearing, and to maintain fixed pitch when held against rotation, a plurality of hydraulic couplings including a common fluid pressure source respectively operable to cause rotation of said gear in one direction or the other or for causing fixing of said gear against rotation, and propeller driven centrifugal means responsive to failure of said fluid pressure source for fixing said gear.

19. In a propeller blade pitch changing mechanism, a propeller shaft, a power gear mounted for rotation with said shaft, planetary pitch changing gearing including a pitch changing sleeve rotatable with said shaft to fix the blade angle and adapted to shift the blade angle in one direction or the other upon the retarding or advancing of said sleeve rotation relative to said shaft, means for rotating said sleeve with, in retard or in advance of said shaft including a brake having rotatable and stationary braking discs, hydraulic means for applying pressure to said discs from one side, centrifugal speed responsive means driven from said shaft operative to frictionally engage said discs over a range of speeds above a set minimum, centrifugally controlled fluid pressure means driven from said shaft adapted to provide fluid pressure increasing with shaft rotation speed at all speeds above said set minimum, means responsive to said fluid pressure for overcoming said centrifugal speed responsive means and rendering the same non-operative, an auxiliary pitch changing means drivably connected to said pitch changing sleeve, energizable to effect pitch changes, and means responsive to a certain value of said centrifugally controlled fluid pressure for disabling operation of said auxiliary pitch changing means.

20. In a propeller blade pitch changing mechanism, a propeller shaft, a power gear mounted for rotation with said shaft, planetary pitch changing gearing including a pitch changing sleeve rotatable with said shaft to fix the blade angle and rotatable with respect to the shaft to shift the blade angle in one direction or the other upon the retarding or advancing of said sleeve rotation relative to said shaft, means for rotating said sleeve with, said shaft including a brake having rotatable braking discs connected to rotate with said sleeve and stationary braking discs, selectively operable driving connections to rotate said sleeve relative to the hub from said power gear, hydraulic means for applying pressure to said discs from one side, centrifugal speed responsive means driven from said shaft operative to frictionally engage said discs from the other side over a range of speeds above a set minimum, an oil pressure centrifugally controlled pump, feeding said hydraulic means, driven from said shaft adapted to provide oil at a pressure increasing with shaft rotation speed, and means responsive to said last named oil pressure for overcoming said centrifugal speed responsive means and rendering the same non-operative.

21. In a variable pitch propeller, a propeller hub, blades swivelled in said hub, means including a coaxial rotatable member on said hub drivably connected to said blades for increasing or decreasing the pitch of said blades depending on relative rotation between said member and said hub in one direction or the other respectively, a power gear driven by said hub, planetary gearing for transmitting torque from said power gear to said rotatable member, and a plurality of gear means for driving said planetary gearing at different speeds to increase or decrease the pitch of the blades.

22. In a variable pitch propeller, a propeller hub, blades swivelled in said hub, means including a coaxial rotatable member on said hub drivably connected to said blades for increasing or decreasing the pitch of said blades depending on relative rotation between said member and said hub in one direction or the other respectively, a power gear driven by said hub, planetary gearing for transmitting torque from said power gear to said rotatable member, said planetary gearing comprising a gear which is stationary when no increase or decrease in pitch is being effected, and means operated by said power gear and effective through said planetary gearing for rotating said member relative to said hub in one direction or the other at different speeds.

23. In a variable pitch propeller, a hub, blades swivelled therein and adapted to be moved from a reverse pitch position to a feathered position, means deriving power from the rotating hub for moving said blades from the one position to the other, auxiliary means for changing pitch, and means actuated by change in rotation speed of said hub through a selected speed valve for disconnecting said auxiliary means and connecting said power deriving means.

24. In a variable pitch propeller, a hub, blades swivelly mounted therein for a normal and reverse range of pitch adjustment, means for varying the pitch of said blades deriving power therefor from the rotation of said hub, and including control means for effecting increases in pitch, and control means for effecting decreases in pitch, a governor for maintaining substantially constant speed to actuate one or the other of said control means when in the normal pitch range, means for overriding said governor to prevent actuation of said control means by the governor and to operate said pitch varying means to swivel said blades into the reverse pitch range, and means actuated by the establishment of reverse pitch for reconnecting said governor reversely with respect to both of said control means to maintain constant speed in the reverse pitch range.

25. In combination, a variable pitch propeller comprising a hub and swivelly mounted blades carried thereby, a control member rotatable with and with respect to the hub respectively for holding said blades at fixed pitch and for increasing and decreasing blade pitch, a hydraulically operated brake for holding said control member to rotate with the propeller, hydraulically operable clutches respectively engageable to advance and retard control member rotation relative to the propeller hub, a fluid pressure supply for said brake and clutches, means controlling said pressure substantially in proportion to propeller rotational speed, means responsive to substantial propeller speed independent of the hydraulic mechanism of the brake, urging said brake to a braking condition, means for applying said fluid under pressure to overcome said responsive means to hold said brake in a condition for engagement or disengagement by the aforesaid hydraulics of the brake, and means selectively operable to direct pressure fluid to one or the other of said brakes or clutches for normal operation thereof.

26. A structure according to claim 25 including an auxiliary power unit including means to couple it to said control member for rotating the member with and with respect to said propeller, and means responsive to high pressure of said hydraulic pressure fluid for uncoupling, and responsive to low pressure of said fluid for coupling, said auxiliary power unit to said control member.

27. In combination with a propeller having pitch changing means including means for changing the propeller pitch between forward and reverse positions, the propeller pitch being determined by the position of the pitch changing means, a governor connected with said pitch changing means for positioning same, means independent of the governor for overcontrolling and disconnecting the governor and for operating said pitch changing means, selectively, to move the blades from forward pitch to reverse pitch and vice versa, means actuated by said pitch changing means for reversing the connections between the governor and the pitch changing means to reverse the action of the governor on said pitch changing means when the governor is connected thereto, as the propeller changes from a forward to a reverse pitch position and vice versa, and means actuated by attainment of reverse pitch or forward pitch, as selected, to reconnect said propeller to governor control.

28. In combination with a propeller having pitch changing means including means for changing the propeller pitch between forward and reverse pitch positions, the propeller pitch being determined by the position of the pitch changing means, a governor connected with said pitch changing means for positioning same, said governor having means for supplying power selectively to move said pitch changing means in one direction or the other in response to propeller speed changes, means independent of the governor for overcontrolling and disconnecting the governor and for operating said pitch changing means selectively to move the blades from forward pitch to reverse pitch and vice versa, means actuated by the propeller as it changes pitch for changing the connections between the governor and the pitch changing means to reverse the action of the governor on said pitch changing means, when the governor is connected thereto, as the propeller changes between a forward and a reverse pitch condition, and means actuated by attainment of reverse pitch or forward pitch as selected to reconnect said propeller to governor control.

29. In combination with a propeller having pitch changing means including means for changing the propeller pitch between forward and reverse pitch positions, the propeller pitch being determined by the position of the pitch changing means, a governor connected with said pitch changing means for positioning same, means independent of the governor for overcontrolling and disconnecting the governor and for operating said pitch changing means, selectively, to move the blades from forward pitch to reverse pitch and vice versa, means actuated by said pitch changing means for reversing the connections between the governor and the pitch changing means to reverse the action of the governor thereon, when the governor is connected thereto, as the propeller passes through substantially zero pitch position, and means actuated by attainment of reverse pitch or forward pitch, as selected, to reconnect said propeller to governor control.

30. In combination with a reversible pitch propeller, a governor for controlling the propeller speed by varying the propeller pitch, means connecting said governor with said propeller, means for changing said connecting means to reverse the action of said governor on said propeller, means independent of the governor for overcontrolling and disconnecting said governor and for varying propeller pitch selectively to move the blades from forward pitch to reverse pitch and vice versa, means actuated by propeller pitch changing movement for actuating said changing means to reverse the action of said governor on said propeller when the propeller reaches a predetermined pitch position, and means actuated by attainment of reverse pitch or forward pitch, as selected, to reconnect said propeller to governor control.

31. In combination with a reversible controllable pitch propeller, a governor for controlling the propeller speed by varying the propeller pitch, means operatively connecting said governor with said propeller, means for changing said connecting means to reverse the action of said governor on said propeller, means independent of the governor for overcontrolling and disconnecting same and for varying propeller pitch independently of the governor, selectively, to move the blades from forward pitch to reverse pitch and vice versa, means actuated by pitch changing movement for actuating said changing means to reverse governor action, and means responsive to attainment of reverse pitch, or forward pitch, as selected, to restore said propeller to governor control.

CHARLES W. CHILLSON.

References Cited in the file of this patent

UNITED STATES PATENTS

| Number | Name | Date |
|---|---|---|
| 962,819 | Cowley | June 28, 1910 |
| 1,878,011 | Squires | Sept. 20, 1932 |
| 1,913,718 | Morgan | June 13, 1933 |
| 2,029,318 | Hagenbook | Feb. 4, 1936 |
| 2,173,660 | Perkins | Sept. 19, 1939 |
| 2,231,343 | Mader | Feb. 11, 1941 |
| 2,248,789 | Setterblade | July 8, 1941 |
| 2,314,025 | Waseige | Mar. 16, 1943 |
| 2,364,951 | Corte | Dec. 12, 1944 |
| 2,365,676 | Burkhalter | Dec. 26, 1944 |
| 2,376,673 | Duchaussoy | May 22, 1945 |
| 2,378,938 | McCoy | June 26, 1945 |
| 2,388,276 | McCoy | Nov. 6, 1945 |
| 2,403,899 | Ammen | July 16, 1946 |
| 2,404,703 | Florian | July 23, 1946 |
| 2,423,191 | Kopp | July 1, 1947 |
| 2,437,189 | Forsyth | Mar. 2, 1948 |
| 2,455,378 | McCoy | Dec. 7, 1948 |
| 2,491,172 | Forsyth | Dec. 13, 1949 |

FOREIGN PATENTS

| Number | Country | Date |
|---|---|---|
| 556,825 | Great Britain | Oct. 22, 1943 |